(12) United States Patent
Meyer et al.

(10) Patent No.: US 11,650,404 B2
(45) Date of Patent: May 16, 2023

(54) DEVICE FOR THERMOCYCLING BIOLOGICAL SAMPLES, MONITORING INSTRUMENT COMPRISING THE SAME, AND METHOD FOR THERMOCYCLING BIOLOGICAL SAMPLES USING SUCH DEVICE

(71) Applicant: Roche Molecular Systems, Inc., Pleasanton, CA (US)

(72) Inventors: Andreas Meyer, Keltern (DE); Timo Ottenstein, Landau (DE)

(73) Assignee: Roche Molecular Systems, Inc., Pleasanton, CA (US)

( * ) Notice: Subject to any disclaimer, the term of this patent is extended or adjusted under 35 U.S.C. 154(b) by 170 days.

(21) Appl. No.: 17/149,975

(22) Filed: Jan. 15, 2021

(65) Prior Publication Data

US 2021/0223527 A1  Jul. 22, 2021

(30) Foreign Application Priority Data

Jan. 16, 2020 (EP) .................................... 20152206

(51) Int. Cl.
*G02B 21/00* (2006.01)
*G02B 5/20* (2006.01)
(Continued)

(52) U.S. Cl.
CPC ......... *G02B 21/0032* (2013.01); *G02B 5/205* (2013.01); *G02B 21/0064* (2013.01); *G02B 21/0076* (2013.01); *G02B 21/086* (2013.01); *G02B 21/125* (2013.01); *G02B 21/26* (2013.01); *G02B 21/36* (2013.01)

(58) Field of Classification Search
CPC .............. G02B 21/0032; G02B 5/205; G02B 21/0064; G02B 21/0076; G02B 21/086; G02B 21/125; G02B 21/26; G02B 21/36; G02B 5/20; G02B 5/201; G02B 7/006; G02B 21/00; G02B 21/0004; G02B 21/002; G02B 21/0052; G02B 21/06; G02B 21/08; G02B 21/082; G02B 21/088; G02B 21/10; G02B 21/12; G02B 21/34; G02B 21/361; G02B 21/362; G02B 21/365; G02B 27/0025; G01N 21/64; G01N 21/6456; G01N 21/6458; G01N 2021/6463; G01N 2021/6471; G01N 21/6486
USPC ....... 359/385, 362, 363, 368, 369, 381, 387, 359/388, 389, 390, 391, 392, 393, 396, 359/398
See application file for complete search history.

(56) References Cited

U.S. PATENT DOCUMENTS 5,835,262 A * 11/1998 Iketaki .................. G02B 21/06 359/386
9,052,494 B2 * 6/2015 Hwang .............. G01N 21/9501
(Continued)

*Primary Examiner* — Arnel C Lavarias
(74) *Attorney, Agent, or Firm* — Maneesh Gupta

(57) ABSTRACT

An optical measurement unit for a scanning device, a scanning device, and a method for operating a scanning device, for high throughput sample analysis of biological samples are disclosed. An illumination system is used to emit light of at least two different illumination wavelength ranges, and an imaging system is used to detect light of at least two different detection wavelength ranges, in order to detect electromagnetic radiation within a field of view for determining the positioning of a sample within the field of view.

15 Claims, 13 Drawing Sheets

(51) Int. Cl.
  *G02B 21/08*  (2006.01)
  *G02B 21/12*  (2006.01)
  *G02B 21/26*  (2006.01)
  *G02B 21/36*  (2006.01)

(56) References Cited

U.S. PATENT DOCUMENTS

| | | |
|---|---|---|
| 2015/0204784 A1 | 7/2015 | Crandall et al. |
| 2015/0228069 A1* | 8/2015 | Fresquet ............... G01B 11/14 348/87 |
| 2015/0243024 A1* | 8/2015 | Fresquet ............... B24B 37/005 348/77 |
| 2015/0370058 A1 | 12/2015 | Bouzid |
| 2017/0241912 A1 | 8/2017 | Wietzorrek |

* cited by examiner

DEVICE FOR THERMOCYCLING BIOLOGICAL SAMPLES, MONITORING INSTRUMENT COMPRISING THE SAME, AND METHOD FOR THERMOCYCLING BIOLOGICAL SAMPLES USING SUCH DEVICE

CROSS-REFERENCE TO RELATED APPLICATION

This application claims the benefit and priority of European Application Serial No. 20152206.7, filed Jan. 16, 2020, which is incorporated herein by reference.

TECHNICAL FIELD

Generally, the present disclosure relates to the technical field of sample analysis such as the analysis of biological samples, and further to the technical field of high throughput analysis of biological samples. In particular, the present disclosure is directed to an optical measurement unit for a scanning device, to a scanning device and a method for operating a scanning device.

In other words, the present disclosure relates to an optical measurement unit which is arranged to measure the intensity of light. In further detail, the optical measurement unit relates to the field of DNA analysis, wherein the optical measurement unit is arranged to measure or detect the intensity of light emitted by biological samples. The biological samples may be a product of a Polymerase Chain Reaction (PCR), in particular generated in the course of a digital PCR (dPCR). The light detected or measured may be fluorescent light emitted by the biological samples due to excitation. The optical measurement unit usually comprises an illumination system and an imaging system. The illumination system is arranged to emit light and illuminate a region of interest. The imaging system is arranged to detect light within the region of interest. For example, the optical measurement unit is part of the scanning device. The scanning device may be a plate reader, which is arranged to carry a plate with multiple wells, in which the biological samples are arranged.

BACKGROUND

Biological samples are usually taken from patients by medical personnel in hospitals or in private practice, for laboratory analysis, e.g. for determining concentration levels of different components within the taken samples. Accordingly, the terms "sample" and "biological sample" refer to material(s) that may potentially contain an analyte of interest, wherein the biological sample can be derived from any biological source, such as a physiological fluid, including blood, saliva, ocular lens fluid, cerebrospinal fluid, sweat, urine, stool, semen, milk, ascites fluid, mucous, synovial fluid, peritoneal fluid, amniotic fluid, tissue, cultured cells, or the like, and wherein the sample can be suspected to contain a certain antigen or nucleic acid.

It is essential for many biological, biochemical, diagnostic or therapeutic applications to be able to accurately determine the amount or concentration of a certain substance or compound in a biological sample contained in a reaction mixture, such as a certain antigen or nucleic acid as mentioned above. To achieve this goal accurately, methods have been developed over the years, such as the widely known Polymerase Chain Reaction (PCR), for example in the form of a real-time PCR, digital PCR (dPCR) or multiplex PCR, which enable the in vitro synthesis of nucleic acids in a biological sample, through which a DNA segment can be specifically replicated, i.e. a cost-effective way to copy or amplify small segments of DNA or RNA in the sample. The development of these methods for amplifying DNA or RNA segments has generated enormous benefits in gene analysis as well as the diagnosis of many genetic diseases, or also in the detection of viral load.

In the course of a typical PCR conduct, a specific target nucleic acid is amplified by a series of reiterations of a cycle of steps in which nucleic acids present in the reaction mixture are (a) denatured at relatively high temperatures, for example at a denaturation temperature of more than 90° C., usually about 94°–95° C., for separation of the double-stranded DNA, then (b) the reaction mixture is cooled down to a temperature at which short oligonucleotide primers bind to the single stranded target nucleic acid, for example at an annealing temperature of about 52°-56° C. for primer binding at the separated DNA strands in order to provide templates (annealing), and, thereafter, (c) the primers are extended/elongated using a polymerase enzyme, for example at an extension temperature at about 72° C. for creation of new DNA strands, so that the original nucleic acid sequence has been replicated. Repeated cycles of denaturation, annealing and extension, usually about 25 to 30 repeated cycles, result in the exponential increase in the amount of target nucleic acid present in the sample, wherein the time for heating and cooling the samples has a significant influence on the overall process time.

Digital polymerase chain reaction (digital PCR, DigitalPCR, dPCR, or dePCR) is a biotechnological refinement of conventional polymerase chain reaction methods that can be used to directly quantify and clonally amplify nucleic acids strands including DNA, cDNA or RNA. The key difference between dPCR and PCR lies in the method of measuring nucleic acids amounts, with the former being a more precise method than PCR, though also more prone to error in the hands of inexperienced users. A "digital" measurement quantitatively and discretely measures a certain variable, whereas an "analog" measurement extrapolates certain measurements based on measured patterns. PCR carries out one reaction per single sample. dPCR also carries out a single reaction within a sample, however the sample is separated into a large number of partitions and the reaction is carried out in each partition individually. This separation allows a more reliable collection and sensitive measurement of nucleic acid amounts. The method has been demonstrated as useful for studying variations in gene sequences—such as copy number variants and point mutations—and it is routinely used for clonal amplification of samples for so called "next-generation sequencing".

Usually, dPCR is used for detecting particularly small concentrations of the components within the biological samples. In a dPCR, the presence of the components within the biological samples is detected by means of an intensity of a fluorescent light signal. In case the component of interest is actually present in the biological sample, the intensity of the fluorescent signal increases after every cycle of the PCR. Thus, the ability to also detect weak fluorescent light signals enables the detection of small concentrations of the components after only few cycles of the PCR. Therefore, an increased sensitivity of an optical measurement unit results in a more efficient detection of the component in the biological sample. As a result, a highly sensitive optical measurement unit, which has a high signal-noise-ratio, is highly desirable for an efficient and reliable dPCR. Hence, there is a need to improve the sensitivity of the optical measurement unit, to achieve cost efficient and precise analysis results in the dPCR.

As known prior art in this technical field, US 2005/133724A1 discloses a system for conducting a polymerase chain reaction (PCR) assay upon a collection of samples, wherein the PCR assay is performed by absorption detection. Here, the system includes a collection of photodetectors, and a corresponding number of light sources which are positioned such that light emitted from each of the respective light sources passes through a corresponding well retained in the multi-well plate and to a corresponding photodetector. The system also includes a processor or other means for analyzing the output signals from the photodetectors.

As further known prior art, Korean publication 20160029748 A shows a system for processing a plurality of biological samples with a support portion and a temperature controller, wherein the support portion is configured to maintain the interior chamber and the inner chamber being located within a case that includes a substrate including a plurality of discrete reaction sites containing one or more biological samples. The temperature controller is configured for the at least one analysis or reaction of the biological sample so as to maintain or control the support, the casing, or the one or more at least one of the temperature of the biological sample. The support is further configured to maintain the surface of the at least one surface of the substrate during the assay or reaction with a positive angle relative to the horizontal plane.

Commonly known optical measurement units for dPCR applications are usually arranged to detect fluorescent light of a multiplicity of biological samples, which are provided in separate wells. According to a first known approach, the biological samples are illuminated separately, and the intensity of the fluorescent light of the multiplicity of biological samples is measured consecutively. This approach requires an individual adjustment of the relative position between the biological sample and the optical measurement unit for each biological sample separately. Hence, this first approach is rather time consuming. According to a second approach, the multiplicity of biological samples is illuminated in parallel, and the intensity of the fluorescent signal is captured in parallel. Here, capturing the intensity of the fluorescent signal in parallel bears the problem that the multiple biological samples have a different positions relative to the optical measurement unit. Thus, the multiplicity of biological samples requires illuminating all samples multiple times and capturing the intensity of fluorescent light signal at different focus positions of the optical measurement unit. However, multiple illuminations of the samples cause bleaching which results in the phenomenon of reduced intensity of the fluorescent light due to degradation of fluorescent molecules in the biological samples. Hence, both the first and the second known approach bear significant disadvantages. Due to these and other problems, the prior art suggestions as presented above cannot fulfill the needs of users nowadays and, thus, do not provide satisfying solutions. Therefore, the general need exists these days in the present technical field to provide an optical measurement unit for detection of fluorescent signals with a further improved optical performance in order to make the detection of fluorescent signals faster and, thus, cheaper to perform while maintaining or even improving sensitivity as well as efficiency.

SUMMARY OF THE DISCLOSURE

In one embodiment, the disclosure provides an optical measurement unit for a scanning device comprising an illumination system arranged to emit light of at least two different illumination wavelength ranges, and an imaging system arranged to detect light of at least two different detection wavelength ranges, wherein each detection wavelength range is assigned to one of the illumination wavelength ranges; the illumination system is adapted for transillumination in a bright-field mode and in a dark-field mode; the illumination system has a first numerical aperture; the imaging system has a second numerical aperture, and the first numerical aperture is larger than the second numerical aperture.

Also provided is a scanning device comprising the optical measurement unit as described herein and an object mount, wherein the imaging system is adapted to detect electromagnetic radiation within a field of view, and the object mount is adapted to determine the positioning of a sample along an x-axis, a y-axis and a z-axis within the field of view.

A method for operating a scanning device is also provided that includes the steps of
  a) generating a consumable-specific focus map, wherein
    a1) the consumable is moved to a multiplicity of focus map positions along the x- and y-axis,
    a2) at each focus map position an image set is generated by focus stacking along the z-axis,
    a3) an optimum z-axis position is determined at each focus map position, and
    a4) the optimum z-axis position are assigned to the focus map positions respectively,
  b) scanning the sample, wherein
    b1) the consumable is moved to a scan position along the x- and y-axis,
    b2) the consumable is moved to a focus position along the z-axis, wherein the focus position is determined by means of the consumable-specific focus map,
    b3) the illumination system is set into dark field mode,
    b4) the illumination system illuminates the sample within the field of view with the different illumination wavelength ranges consecutively and the imaging system captures an image of the sample within the field of view for each assigned detection wavelength range, and
    b5) the method steps b1) to b4) are repeated at different scan positions, until the imaging system has captured the entire sample.

DETAILED DESCRIPTION

Figure 1:
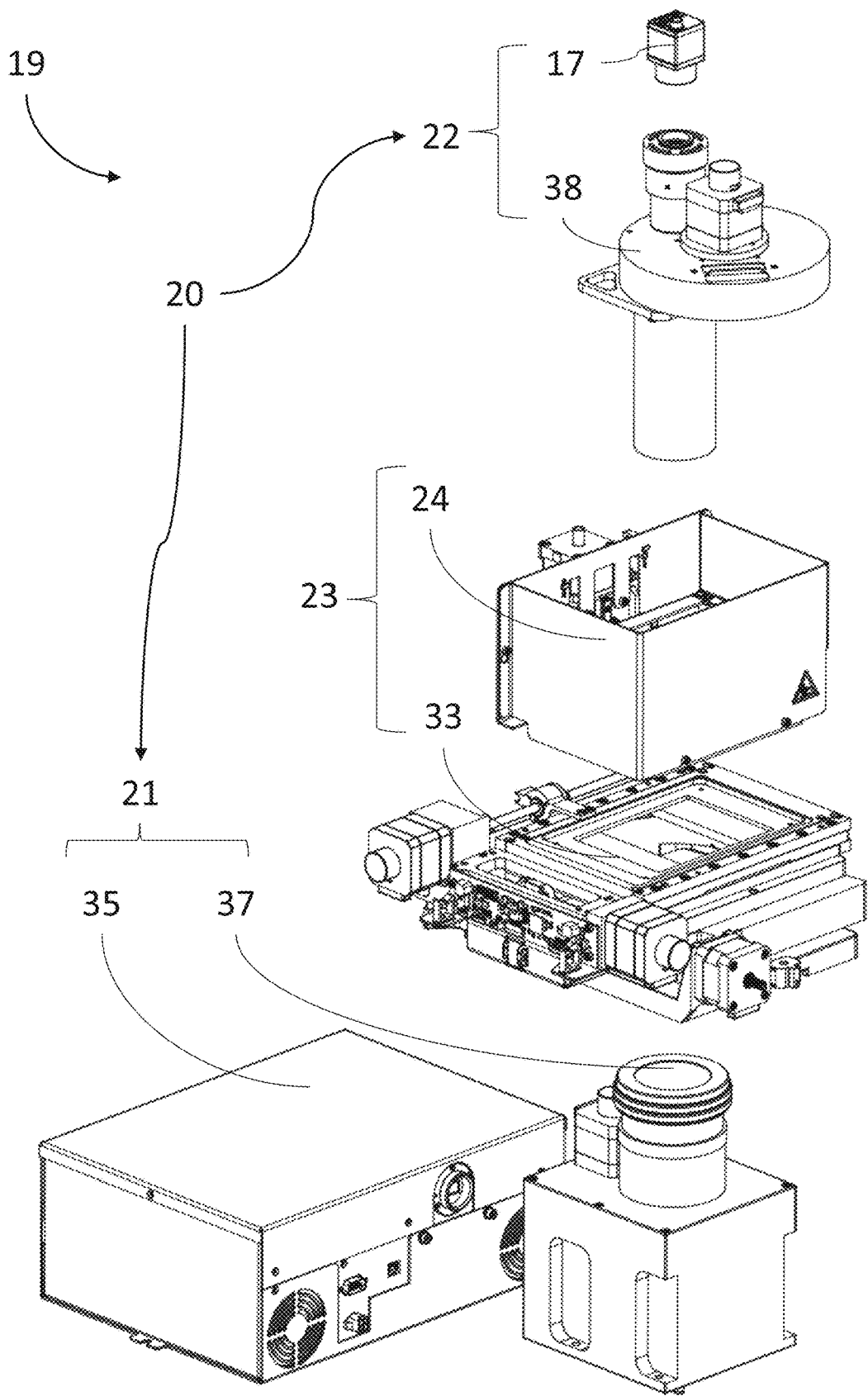
FIG. 1 is an exploded view of a scanning device comprising an optical measurement unit according to an embodiment of the present disclosure.

The present disclosure addresses the above described problems by means of an improved optical measurement unit for a scanning device, by means of such scanning device, as well as by means of a method for operating such scanning device. According to a first aspect of the present disclosure, the improved optical measurement unit comprises an illumination system arranged to emit light of at least two different illumination wavelength ranges, and an imaging system arranged to detect light of at least two different detection wavelength ranges. Each detection wavelength range is assigned to one of the illumination wavelength ranges. The illumination system is adapted for transillumination in a bright-field mode and in a dark-field mode. Moreover, the illumination system has a first numerical aperture, the imaging system has a second numerical aperture, and the first numerical aperture is larger than the second numerical aperture.

The illumination system of the present disclosure may be arranged to illuminate a region of interest with light of the two different detection wavelength ranges. Furthermore, the illumination system of the present disclosure is arranged so that the light emitted by the illumination system is capable of exciting a fluorescent material, causing the fluorescent material to emit fluorescent light. In particular, the light emitted by the illumination system is selected such that the intensity and wavelength of the light are adapted for exciting a predefined fluorescent material. Here, the biological samples are arranged within the region of interest. Thus, the illumination system of the present disclosure is arranged to illuminate the biological samples, and, in particular, the illumination system is arranged to illuminate a multiplicity of biological samples simultaneously.

The biological sample or the multiplicity of biological samples may be arranged within a microfluidic device in the form of a microfluidic chip or dPCR chip. Microfluidic dPCR chips usually provide microscale channels to receive microliter or nanoliter-scale samples in the form of streamable liquid, and microliter-scale reagents are typically held in an array of small wells provided as reaction chambers on the microfluidic chip, wherein the chip can also comprises other kinds of reaction chambers in the form recesses, channels or other structures for retaining the biological samples and reagents. Here, the reagents can be placed to contact a stream of the sample liquid in a reaction flow channel, wherein each type of assay is dependent on the reagents loaded into the array of wells as well as the configuration of reaction channels and detectors. Accordingly, the chip can be adapted to contain a multiplicity of biological samples and/or reagents during PCR processes. Moreover, the chip can be a disposable or single-use device and may comprise a transparent material. Advantageously, the chip is configured not only to contain the sample during PCR but also during measurement of the fluorescent light of the excited fluorescent material by means of the optical measurement unit.

The excited fluorescent material generates fluorescent light which comprises light of at least one of the detection wavelength ranges. The fluorescent material is assigned to the corresponding detection wavelength range and the corresponding illumination wavelength range. In this context, the detection wavelength ranges may deviate from the illumination wavelength range. In particular, the illumination wavelength range and the assigned detection wavelength range can be chosen to not overlap with each other. Also, the imaging system is arranged to detect or measure light from the region of interest. In particular, the imaging system can be adapted to detect or measure light which is emitted by the biological samples, for example in a mechanical manner. In this regard, the biological samples can emit fluorescent light particularly within the detection wavelength ranges.

Furthermore, the imaging system provides the ability to toggle between a bright-field mode and a dark-field mode. In the bright-field mode, the light emitted by the illumination system is transmitted through the biological sample, i.e. passing there-through, and contrast in the sample is caused by attenuation of the transmitted light in optically dense areas of the sample. In particular, the light emitted by the illumination system in the bright-field mode consists of light of at least one of the illumination wavelength ranges. Furthermore, in the bright-field mode, there is at least a partial overlap between the wavelength range of the light emitted by the illumination system and the wavelength range of the light detected by the imaging system. In the dark-field mode, the illumination system is adjusted, such that solely light which is scattered between the illumination system and the imaging system is being detected by the imaging system. Furthermore, the imaging system may be arranged to detect solely fluorescent light in the dark-field mode. Moreover, in the dark-field mode, the detection wavelength range may deviate from the illumination wavelength range. In particular, in the dark-field mode, the detection wavelength range and the illumination wavelength range do not overlap. Advantageously, in the dark-field mode, the signal-noise ratio of the detected light becomes very high.

With the illumination system of the present disclosure, the first numerical aperture is used to describe the emission cone of the illumination system, and the second numerical aperture is used to describe the acceptance cone of the imaging system. In particular, the larger the numerical aperture of the imaging system, the greater is the aperture angle of the acceptance cone. For example, the imaging system captures solely a fraction of the light emitted by the illumination system. Advantageously, this ratio of first numerical aperture and second numerical aperture enables the dark field mode.

According to one embodiment of the optical measurement unit, the imaging system is bi-telecentric and the illumination system is bi-telecentric. A system is bi-telecentric or double telecentric, if its entrance pupil and its exit pupil are at infinity. The entrance pupil of the imaging system at infinity makes the object-space of the imaging system telecentric. Advantageously, the telecentric object-space of the imaging system results in magnification being independent of the distance or position of the biological sample within in the region of interest. The exit pupil of the imaging system at infinity makes the image-space of the imaging system telecentric. Advantageously, the telecentric image-space minimizes the range of angles of detected light. Thereby shading problems are minimized, wherein the shading problems are caused by micro-optics included in a digital image sensor, for example a CMOS sensor, for detection of light. The entrance pupil of the illumination system at infinity advantageously results in homogeneous emission of light. Additionally the illumination system may comprise a homogenizing rod, which emits at its output facet light having homogeneous intensity. The high and constant relative illumination of the telecentric illumination system enables to maintain the homogeneity in the sample plane. Telecentricity of the illumination system supports the homogeneous illumination since telecentric lenses have a constant relative illumination by design, which is particularly advantageous for the generation of the darkfield mode. In particular, the light emitted by the illumination system impinges on the sample plane with angles up to 17 degrees. For example, the illumination system has a numerical aperture of 0.3. Advantageously, the illumination system is adjusted, to illuminate the entire region of interest with light having a homogeneous intensity.

According to one embodiment, in the dark-field mode, the illumination system is arranged to emit light in a first angle range, and in the bright field mode, the illumination system is arranged to emit light in a second angle range. The first angle range comprises angles larger than a maximum angle of acceptance of the imaging system, and the second angle range comprises angles smaller than the maximum angle of acceptance of the imaging system. In particular, the first angle range solely comprises angles larger than a maximum angle of acceptance of the imaging system. Thus, in the dark-field mode, the imaging system does not detect radiation emitted by the illumination system, unless the light is scattered. The second angle range may comprise both angles larger than the maximum angle of acceptance and smaller than the maximum angle of acceptance of the imaging system.

For example, the illumination system comprises a circular light stop. The circular light stop may be arranged to toggle between a first and a second state. In the first state, the circular light stop blocks light, which results in emission of light in the first angle range, and in the second state, the circular light stop blocks less light than in the first state, which results in emission of light in the second angle range. In further detail, the circular light stop does not block any light in the second state. In the first state, the circular light stop may be arranged to block light in the center of an aperture stop of the illumination system. In particular, the circular light stop is arranged to block light within a numerical aperture of 0.1 on the output side of the illumination system. More precisely, the dark-field mode is realized by means of the circular light stop, as for imaging a telecentric lens with a numerical aperture of 0.083 is used. Advantageously, switching between the first and second state of the circular light stop enables a simple switching between the bright-field mode and the dark-field mode.

According to one embodiment of the optical measurement unit of the present disclosure, each illumination wavelength range is designed to excite a predefined fluorescent material to generate fluorescent light. This fluorescent light resides within the detection wavelength range assigned to the respective illumination wavelength range. In particular, the illumination wavelength range comprises shorter wavelengths than the respectively assigned detection wavelength range. In this regard, the following table "Table 1" lists different illumination wavelength ranges, the minimum light power of the generated light in the illumination system, and the minimum light power emitted by the illumination system in a NA range of 0.1 to 0.3:

TABLE 1

| Illumination wavelength range/ wavelength band | Minimum light power of the generated light | Minimum light power emitted by the illumination system in NA range 0.1 to 0.3 |
| --- | --- | --- |
| 424-445 nm | 1600 mW | 1000 mW |
| 482-502 nm | 450 mW | 300 mW |
| 537-550 nm | 450 mW | 300 mW |
| 565-588 nm | 450 mW | 300 mW |
| 625-635 nm | 450 mW | 300 mW |
| 670-694 nm | 450 mW | 300 mW |

According to another embodiment of the optical measurement unit of the present disclosure, the imaging system comprises a band-pass filter for each detection wavelength range, and a neutral density filter. The bandwidth of the band-pass filters may respectively be arranged, to define the detection wavelength ranges. In particular, the band-pass filter is respectively arranged to suppress light outside of the detection wavelength range by at least three orders of magnitude, preferably by at least six orders of magnitude. For example, the band-pass filter is a dielectric filter. Advantageously, the band-pass filter reduces cross-talk between different detection wavelength ranges and increases the signal to noise ratio of the measurement.

The imaging system of the optical measurement unit of the present disclosure may include a filter switching mechanism which is arranged to place either one of the band-pass filters or the neutral density filter in the beam path of the imaging system. The beam path of the imaging system may also be referred to as the emission path, because imaging system detects the fluorescent signal emitted by the sample. In particular the switching mechanism comprises a filter wheel which allows the placement of up to 7 different filters in the beam path close to an aperture stop of the imaging system. The imaging system may be designed such that the angle of rays transmitting the filters is below 6.8°. Advantageously this minimizes blue shift effects in dielectric band-pass filters. The band-pass filters are used for fluorescence detection, while the neutral density filter is used in the bright-field mode, to prevent the camera from saturation.

For example, the imaging system comprises the filters listed in the following table:

TABLE 2

| Filter type | Optical properties |
| --- | --- |
| First dielectric band pass filter | Transmission >90% from 481 nm to 496 nm; Optical Density 6.0 (OD 6.0) blocking outside of transmission band |
| Second dielectric band pass filter | Transmission >90% from 516 nm to 536 nm; OD 6.0 blocking outside of transmission band |
| Third dielectric band pass filter | Transmission >90% from 562 nm to 579 nm; OD 6.0 blocking outside of transmission band |
| Fourth dielectric band pass filter | Transmission >90% from 602 nm to 612 nm; OD 6.0 blocking outside of transmission band |

TABLE 2-continued

| Filter type | Optical properties |
|---|---|
| Fifth dielectric band pass filter | Transmission >90% from 650 nm to 670 nm; OD 6.0 blocking outside of transmission band |
| Sixth dielectric band pass filter | Transmission >90% from 709 nm to 745 nm; OD 6.0 blocking outside of transmission band |
| Neutral density filter | OD 2.0 |

The optical density (OD) describes the amount of energy that is blocked or reflected by a filter. A high value indicates low transmission, and low optical density indicates high transmission. Optical densities of 6.0 or more are used for applications where extreme blocking is required, such as Raman spectroscopy or fluorescence microscopy. Optical densities of 3.0 to 4.0 are ideal for separating or cleaning laser lines, image processing applications, and for detecting chemical substances, while optical densities (OD) of 2.0 or less are well suited for color sorting and separation of spectral orders. The following formula describes the relation of Percent Transmission (T) and the optical density (OD):

$$OD = -\log(T/100\%) \quad (1)$$

With the present disclosure, there is further provided a scanning device. In particular, the scanning device described in the following comprises the optical measurement unit as described herein. That is, all of the features disclosed for the optical measurement unit are also disclosed for the scanning device, and vice versa.

The scanning device of the present disclosure comprises the optical measurement unit and an object mount, wherein the imaging system is adapted to detect electromagnetic radiation within the field of view, and the object mount is adapted to determine the positioning of a sample along an x-axis, a y-axis and a z-axis within the field of view. The x-, y- and z-axis are imaginary axes of a Cartesian coordinate system. The z-axis runs in the field of view along the main radiation direction of the illumination system. The main radiation direction is parallel to the optical axis, which connects the exit pupil of the illumination system and the entrance pupil of the imaging system. The x-axis and the y-axis run in the field of view perpendicularly to the optical axis. In particular, a movement or positioning of the sample, a chip or a consumable along the x-, y- or z-axis describes a relative movement or position between the imaging system and the sample, chip or consumable. Thus, either sample, chip or consumable, or alternatively/additionally the imaging system may be moved, in order to provide improved positioning. Advantageously, the movement of the sample(s) along the x- and y-axis by means of the object mount enables to position the sample(s) within the field of view of the imaging system. The movement of the sample(s) along the z-axis by means of the object mount enables to adjust the position of the samples(s) to the focus of the imaging system.

Determining the position of the sample by means of the object mount enables an adjustment of the position of the sample within the field of view with respect to the illumination system and the imaging system of the present disclosure. In particular, the positioning of the sample along the x-, y- and z-axis enables the placement of the sample within the focus of the imaging system. Advantageously, a highly precise positioning of the sample within the field of view by means of the object mount results in a high signal to noise ratio when detecting the fluorescent light emitted by the sample.

The object mount may comprise an xyz-stage which is arranged to carry the sample. In particular, the xyz-stage may be arranged to carry a consumable. The consumable may comprise one chip or a plurality of chips. In particular, the consumable comprises a compound of chips, in particular dPCR chips.

According to one embodiment of the scanning device of the present disclosure, the illumination system is arranged to illuminate the sample along the z-axis from a first side of the object mount, and the imaging system is arranged to detect fluorescent radiation which is emitted away from a second side of the object mount, wherein the first and the second side of the object mount are opposed to each other. In particular, the object mount is arranged to transmit light along the z-axis. For example, the object mount comprises a recess, which completely extends through the object mount along the z-axis.

According to another embodiment of the scanning device of the present disclosure, the sample is contained within a consumable, and the object mount comprises a downholder. The downholder is arranged to push a main surface of the consumable against a planar surface of the xyz-stage, in order to achieve a flattening fixation of the consumable. The main surface of the consumable faces away from the downholder and the planar surface of the consumable mount faces the downholder. In particular, the consumable is flattened by pressure along the z-axis, which is applied onto the consumable by means of the downholder. The downholder may provide a well-defined position of the sample relative to xyz-stage.

Also, the downholder can be designed to compensate consumable unevenness or curvatures. In particular, the downholder of the scanning device of the present disclosure may have a frame-like structure, preferably arranged to contact the consumable or the chip only near its outer edges. The downholder presses the consumable or the chip at its outer edges against a planar surface of the xyz-stage, in order to compensate the consumable's unevenness or curvature. In particular, the downholder is designed to not interact with the light detected by means of the imaging system. For example, the downholder has a matt surface finish with low reflectivity. Advantageously, the matt surface reduces stray light, which falsifies the measurement.

Furthermore, the downholder provides for an open state in which no pressure is applied onto the consumable, and for a closed state in which pressure is applied onto the consumable. In particular, in the open state of the downholder, the consumable may be loaded into the xyz-stage and unloaded out of the xyz-stage. In the closed state of the downholder, the consumable is fixated onto the xyz-stage. Advantageously, the fixation of the consumable onto the xyz-stage reduces undesired movement of the consumable.

According to yet another embodiment of the scanning device of the present disclosure, the imaging system and the illumination system are well corrected for chromatic aberration, such that the focus for all detection wavelength ranges is substantially the same. In particular, the imaging system comprises an achromatic lens or an apochromatic lens, in which materials with differing dispersion are assembled together to form a compound lens. For example, the imaging system comprises an achromatic doublet, with elements made of crown and flint glass. In particular, the imaging system comprises a lens which comprises more than two lenses of different material composition. The imaging system may comprise lenses, which are made of low dispersion glass. For example, the low dispersion glass contains fluorite. Advantageously, the imaging system is particularly well corrected for chromatic aberrations of the detection wavelength ranges. Thus, the focus of the imaging system is basically identical for all detection wavelength ranges.

As an alternative to the use of an achromatic lens or apochromatic lens, the imaging system of the scanning device of the present disclosure may comprise a diffractive optical element. The diffractive optical element can be arranged to generate arbitrary complex wave by means of optical material which is essentially flat. In particular, the diffractive optical element has negative dispersion characteristics, complementary to the positive Abbe numbers of optical glasses and plastics. For example, the diffractive optical element has a negative Abbe number of −3.5 in the visible spectrum. The diffractive optical element may be fabricated by means of diamond turning techniques. In particular, the diffractive optical element may be customized to compensate for the dispersion of other optical elements of the imaging system. Advantageously, the other optical elements may be optimized for non-chromatic aberrations, which enables a particularly high resolution of the imaging system.

According to one particular embodiment of the present disclosure, the consumable is a digital PCR chip or dPCR chip. The dPCR chip is adapted to carry a biological sample and reagents for performing a PCR. Furthermore, the dPCR chip is adapted to have a PCR performed within the chip. For example, the PCR and the optical detection of fluorescent signals, which are generated during the PCR, may be performed while the sample is contained in the dPCR chip. Here, in further detail, the dPCR chip is adapted to have thermocycling of the sample performed within the dPCR chip.

According to the present disclosure, there is further provided a method for operating a scanning device as described herein. In particular, the scanning device is operated in the course of the operating method described below. That is, all of the features disclosed for the method are also disclosed for the scanning device and vice versa. The method of the present disclosure for operating a scanning device comprises the steps of a) generating a consumable specific focus map, wherein
a1) the consumable is moved to a multiplicity of focus map positions along the x- and y-axis,
a2) at each focus map position an image set is generated by focus stacking along the z-axis,
a3) an optimum z-axis position is determined at each focus map position, and
a4) the optimum z-axis position are assigned to the focus map positions respectively,
b) scanning the sample, wherein
b1) the consumable is moved to a scan position along the x- and y-axis,
b2) the consumable is moved to a focus position along the z-axis, wherein the focus position is determined by means of the consumable-specific focus map,
b3) the illumination system is set into dark field mode,
b4) the illumination system illuminates the sample within the field of view with the different illumination wavelength ranges consecutively and the imaging system captures an image of the sample within the field of view for each assigned detection wavelength range, and
b5) the method steps b1) to b4) are repeated at different scan positions, until the imaging system has captured the entire sample.

According to one embodiment of the method of the present disclosure, the method additionally comprises the steps of arranging the sample in a chip or consumable on the xyz-stage and performing a flattening fixation of the chip or sample, wherein the chip or consumable is pushed against a planar surface of the xyz-stage by means of the downholder. For example, this method step is performed before method step a). Advantageously, the sample is in a fixed position relative to the xyz-stage. In particular, the scanning device may comprise a gripper module which is arranged to automatically load and unload samples to and from the xyz-stage. For loading and unloading consumables, the xyz-stage is moved along the xy-plane to a handover position. The consumables are loaded and unloaded by the gripper module. Furthermore, the gripper module may comprise a storage, which may carry multiple samples, in particular multiple chips or consumables. The storage may be a so-called plate hotel, which carries multiple plates, wherein each plate is a consumable. For example, the gripper module is arranged to consecutively load and unload chips or consumables. After the sample is loaded, the downholder is closed for fixation and flattening of the chip or consumable. Advantageously, the gripper module enables a fast and precise loading and unloading of consumables.

Preferably, method step a) is performed after a sample is loaded onto the xyz-stage of the scanning device. In particular, the scanning device performs the process steps a) and b), after the scanning device is initialized. The initialization comprises moving the xyz-stage to a dedicated position for unloading and loading of samples. The consumable-specific focus map is generated via focus stacking by moving the object mount along the z-axis. The focus map can be generated in bright- or dark-field mode.

The method step a) includes the following sub-steps a1) to a4) and is performed for a defined number of positions of the consumable in the xy-plane:

In method step a1), which is a sub-step of step a), the consumable is moved along a xy-plane. Here, in particular, the focus map positions are selected for imaging.

In method step a2), which is a sub-step of step a), an image set is generated by focus stacking along the z-axis at each focus map position. In particular, the illumination system is switched to bright-field mode or dark-field mode. If the illumination system is switched to the bright-field mode, the circular light stop is moved out of the beam path of the illumination system, and the neutral density filter is moved in the beam path of the imaging system. In particular, the beam path of the illumination system may be referred to as excitation path, because the fluorescent material in the sample is excited by means of the light going along the excitation path. If the illumination system is switched to the dark-field mode, the circular light stop is moved into the beam path of the illumination system and the neutral density filter is arranged in the beam path of the imaging system.

The focus stacking is performed for a predefined number of images. During the focus stacking, the consumable is moved to one of the predefined positions along the z-axis, the field of view is illuminated by the illumination system with light of a predefined illumination wavelength range and the field of view is captured by means of the imaging system. Afterwards, the illumination system stops illuminating and the consumable is moved along the z-axis to the next position.

The consumable is moved along the x- and y-axis to the next focus map position. The method step a2) is repeated, to generate an image set at each focus map position. After the predefined number of images is captured at one of the focus map positions, the consumable is moved along the xy-plane to the next focus map position and the next image set is captured.

In method step a3), which is a sub-step of step a), an optimum z-axis position determined at each focus map position. Here and in the following, the z-axis position determines the position of the sample along the z-axis with respect to the imaging system. In particular, the optimum z-axis position determined in step a3) is defined by a z-axis position of the xyz-stage. For example, the imaging system comprises a software module with an auto focus algorithm. The auto focus algorithm is arranged to select the image captured at the optimum z-axis position respectively from the image set at each focus map position, which is generated in method steps a1) and a2). The optimum z-axis position is defined, by fitting a focus score over the z-axis positions. The optimum z-axis position may thus be determined to be in between two z-axis positions at which images of the image set were captured.

In method step a4), which is a sub-step of step a), the optimum z-axis positions are assigned to the focus map positions respectively. In particular, the auto focus algorithm assigns to each focus map position the optimum z-axis position of the xyz-stage. Thus, the imaging system may capture an image at each focus map position having best acuity.

In method step b), the actual detection of fluorescent radiation is performed, by means of scanning the sample. The relevant consumable areas or chip areas are scanned at different illumination and detection wavelength ranges. In particular, the scanning is performed at different scanning positions along the xy-plane of the consumable or chip. For example, 56 scanning positions may be designated to one consumable or chip. In particular, each scanning position corresponds to one of the focus map positions. Alternatively, scanning positions may not coincide with the focus map positions, wherein the position along the z-axis for method step b) is determined by interpolation from the optimum z-axis positions determined in method step a). At each scanning position the following sub-steps b1) to b5) are performed:

In method step b1), which is a sub-step of step b), the sample is moved to a scan position along the x- and y-axis. In particular, the scan position corresponds to one of the focus map positions.

In method step b2), which is a sub-step of step b), the sample is moved to the optimum z-axis position, wherein the z-axis position is determined by means of the consumable-specific focus map. In particular, the z-axis position to which the sample is moved in step b2) corresponds to the optimum z-axis position determined in method steps a1) to a3) at each focus map position respectively. Optionally, the consumable may be controlled for dust and dirt in the bright-field mode.

In method step b3), the illumination system is set into the dark-field mode. In the dark-field mode, the circular light stop is arranged in the beam path of the illumination system. In particular, in step b3) the circular light stop is set to the first state, in which the circular light stop blocks a portion of the light generated in the illumination system.

In the method step b4), which is a sub-step of step b), the illumination system illuminates the sample within the field of view with the different illumination wavelength ranges consecutively. For example, one of the band-pass filters is arranged in the beam path of the imaging system and the sample is illuminated by means of the illumination system in the wavelength range assigned to the mentioned band-pass filter. The imaging system captures an image of the sample within the field of view. After an image is captured at one of the wavelength ranges, the filter switching mechanism switches the band-pass filter in the beam path of the imaging system, to adjust the detection wavelength range to the illumination wavelength range. Method step b4) is repeated, until an image is captured at each detection wavelength range.

According to one embodiment of the method, the z-axis position with respect to the illumination system is basically the same for all illumination wavelength ranges, and the z-axis position of the imaging system is basically the same for all detection wavelength ranges.

In method step b5), which is a sub-step of step b), the method steps b1) to b4) are repeated at different scan positions along the xy-plane, until the imaging system has captured the entire sample or the entirety of all samples. In particular, each scan position corresponds to one of the focus map positions.

After the sample is scanned at each scanning position, the downholder is opened. When the downholder is opened, the downholder does not fixate the consumable or chip on the xyz-stage. Thus, the gripper module may access the consumable, to unload the consumable from the object mount. The object mount is moved to the handover position, dedicated for unloading and loading of consumable by means of the gripper module, and the gripper module unloads the consumable.

In particular, the method steps are performed in the order mentioned.

The optical measurement unit of the present disclosure is arranged to provide transillumination. Here and in the following, the term "transillumination" describes a specific arrangement for illuminating a region of interest. Transillumination describes an arrangement, in which the light for illumination enters the region of interest from a first side and the light which is detected by means of the imaging system leaves the region of interest towards a second side, wherein the first side and the second side are on opposite sides of the region of interest. In the present case, the light for illumination may differ from the detected light in its wavelength range.

A region of interest, often abbreviated by "ROI", is a polygonal selection from a two-dimensional (2D) or three-dimensional (3D) space. In the present case, the region of interest defines the borders of a biological sample or of a plurality of biological samples under consideration.

The numerical aperture, usually abbreviated by "NA", of an optical system is a dimensionless number that characterizes the range of angles over which the system can accept or emit light. By incorporating index of refraction in its definition, NA has the property that it is constant for a beam as it goes from one material to another, provided there is no refractive power at the interface.

As used herein and also in the appended claims, the singular forms "a", "an", and "the" include plural reference unless the context clearly dictates otherwise. Similarly, the words "comprise", "contain" and "encompass" are to be interpreted inclusively rather than exclusively; that is to say, in the sense of "including, but not limited to". Similarly, the word "or" is intended to include "and" unless the context clearly indicates otherwise. The terms "plurality", "multiple" or "multitude" refer to two or more, i.e. 2 or >2, with integer multiples, wherein the terms "single" or "sole" refer to one, i.e. =1. Furthermore, the term "at least one" is to be understood as one or more, i.e. 1 or >1, also with integer multiples. Accordingly, words using the singular or plural number also include the plural and singular number, respectively. Additionally, the words "herein," "above,", "previously" and "below" and words of similar import, when used in this application, shall refer to this application as a whole and not to any particular portions of the application.

Furthermore, certain terms are used for reasons of convenience and are not intended to limit the disclosure. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90° or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. The description of specific embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize. Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure as defined by the appended claims. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for the reason of lucidity, if in a section of a drawing not all features of a part are provided with reference signs, it is referred to other sections of the same drawing. Like numbers in two or more figures represent the same or similar elements.

The following examples are intended to illustrate various specific embodiments of the present disclosure. As such, the specific modifications as discussed hereinafter are not to be construed as limitations on the scope of the present disclosure. It will be apparent to the person skilled in the art that various equivalents, changes, and modifications may be made without departing from the scope of the present disclosure, and it is thus to be understood that such equivalent embodiments are to be included herein. Further aspects and advantages of the present disclosure will become apparent from the following description of particular embodiments illustrated in the figures.

Reference(s) to "embodiment(s)" throughout the description which are not under the scope of the appended claims merely represent possible exemplary executions and are therefore not part of the present disclosure.

EXAMPLES

FIG. 1 shows an exploded view of a scanning device 19 according to an embodiment of the present disclosure, with an optical measurement unit 20 according to an embodiment of the present disclosure. The optical measurement unit 20 comprises an illumination system 21 and an imaging system 22. Furthermore, the scanning device 19 comprises an object mount 23 with a downholder 24. The illumination system 21 comprises an illumination objective lens 37 and a light source 35. The imaging system 22 comprises a camera sensor 17 and a second optical system 38. The object mount 23 comprises an xyz-stage 33 and a downholder 24.

The scanning device 19 is arranged to analyze consumables (not shown) utilized in a dPCR with high throughput. In particular, the scanning device 19 is arranged to analyze six measurement wavelength ranges with minimal spectral crosstalk. The scanning device allows for location of a fluorescent sample 30 within a field of view of the imaging system in a bright-field mode and in a dark-field mode. In particular, the scanning device 19 enables the quantitative analysis of the fluorescence signal of the fluorescent sample 30 and the clustering into positive and negative results.

Figure 2:
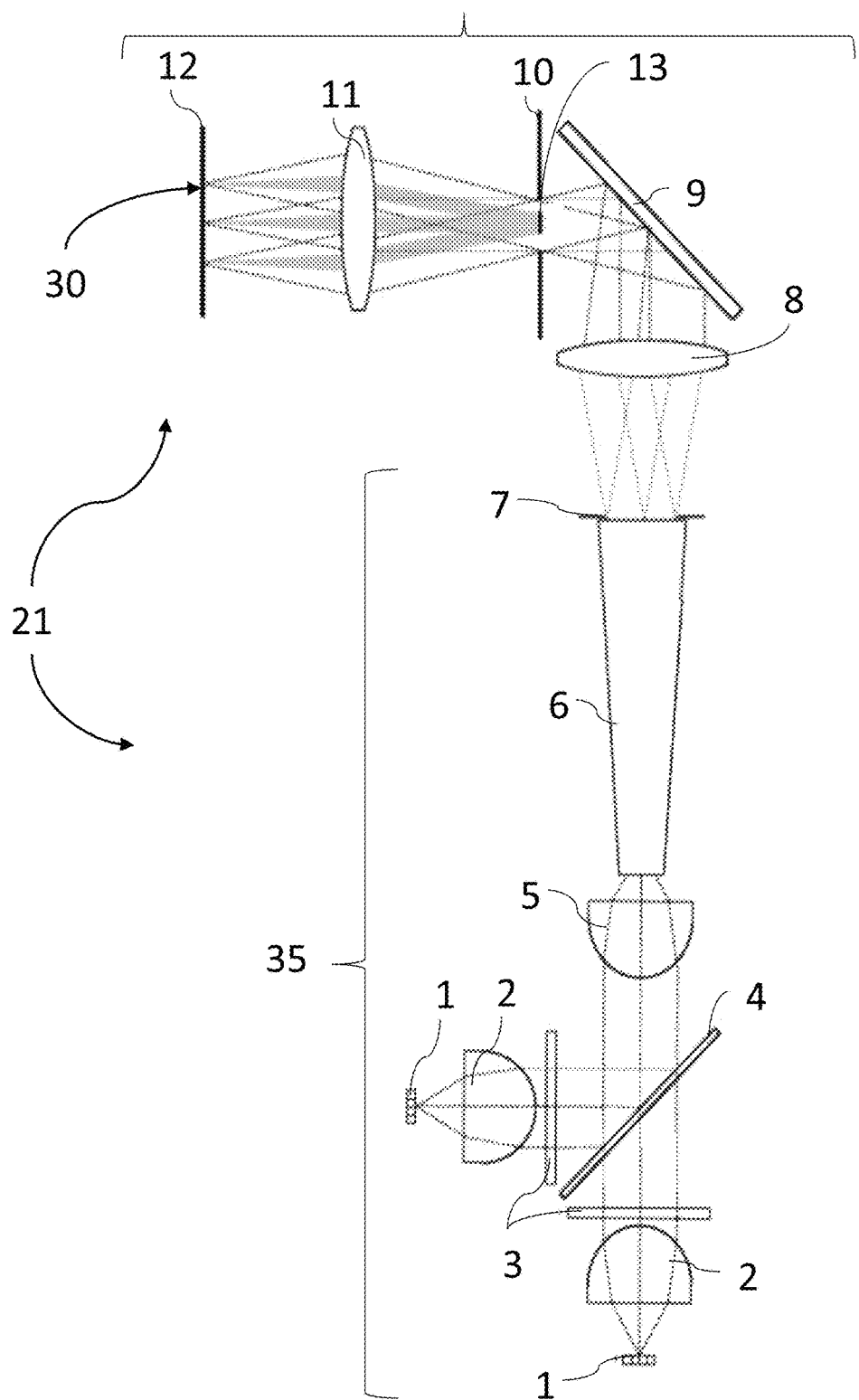
FIG. 2 is a conceptual illustration of an illumination system of the optical measurement unit according to an embodiment of the present disclosure.

FIG. 2 shows the illumination system 21 of the optical measurement unit 20 in a conceptual illustration, wherein light is represented by dashed lines. The illumination system 21 comprises a light emitting diode "LED" array 1, which is part of the light source 35, with LEDs for generating light in the illumination wavelength ranges. In particular, the light source 35 comprises multiple LED arrays 1, wherein each LED array 1 is arranged to emit light at a different wavelength range. For example, the illumination system 21 may be arranged to emit light of at least six different illumination wavelength ranges, wherein the light source 35 comprises six different LED arrays 1. Advantageously, the utilization of an LED array enables the emission of light with a high optical power at each illumination wavelength range.

Furthermore, the illumination system 21 may comprise a collimation optic 2 and a dielectric filter 3, which may be a transmissive band-pass filter. The dielectric filter 3 ensures that only light in the desired illumination wavelength range is emitted by the illumination system 21. In particular, the dielectric filter 3 suppresses light emission outside of the desired illumination wavelength by at least six orders of magnitude. Furthermore, the illumination system 21 may comprise dichroic mirrors 4 in order to overlap the light emitted by different types of LEDs and in order to direct the light in a tapered homogenizing rod 6. The homogenizing rod 6 has several functions. Firstly, the homogenizing rod adapts the numerical aperture NA of the light emitted by the LEDs for subsequent optical components. Secondly, the homogenizing rod 6 creates a homogeneous luminance at an output facet of the homogenizing rod 6. The homogenizing rod 6 may be made of fused silica to minimize the amount of autofluorescence which would lead to an increased background noise. The output facet of the homogenizing rod 6 is covered by a field aperture 7. For example, the field aperture 7 has a size of 14.5×7.6 mm². The field aperture 7 acts as a field stop for the subsequent optical path in the illumination system 21.

The light generated by the different types of LEDs respectively passes the dielectric filter 3. Afterwards, the light of the different types of LEDs is mixed by means of the dichroic mirror 4 and is guided into the homogenization rod 6. When exiting the homogenization rod 6, the light passes through the field aperture 7. In the beam path of the generated light, the illumination unit 21 additionally comprises the illumination objective lens 37. The illumination objective lens 37 comprises a first lens group 8, a folding mirror 9, an aperture stop 10 and a second lens group 11. The illumination objective lens 37 is arranged to guide the light passing the field stop aperture 7. In particular, the light is guided by means of the illumination objective lens, in order to illuminate the field of view in a sample plane 12.

The illumination system 21 has a first numerical aperture NA1. For example, the first numerical aperture NA1 corresponds to the numerical aperture NA1 of the illumination objective lens 37. The first numerical aperture NA1 of the illumination system 21 may be at least 0.2, preferably at least 0.3. For example, the illumination objective lens 37 is a bi-telecentric optical system. The illumination objective lens 37 may be a bi-telecentric projection lens with the first numerical aperture of 0.3 and unit magnification factor. In particular, the illumination system 21 is arranged to create an image of the field aperture 7 in the sample plane 12. The illumination objective lens 37 may additionally comprise a folding mirror 9 which is arranged to adapt the spatial extent of the illumination objective lens.

In FIG. 2, the illumination system 21 is shown in the dark-field mode. Accordingly, a circular light stop 13 is arranged in the center of the aperture stop 10. In particular, the circular light stop 13 is arranged to toggle between the dark-field mode and the bright field mode. The circular light stop 13 blocks light, which results in emission of light within a first angle range. In particular, the circular light stop is arranged to block light within a numerical aperture of 0.1 on the output side of the illumination system. In particular, the dark-field mode is realized by means of the circular light stop 13, as for the imaging system a telecentric lens with a numerical aperture of 0.083 is used.

Figure 3:
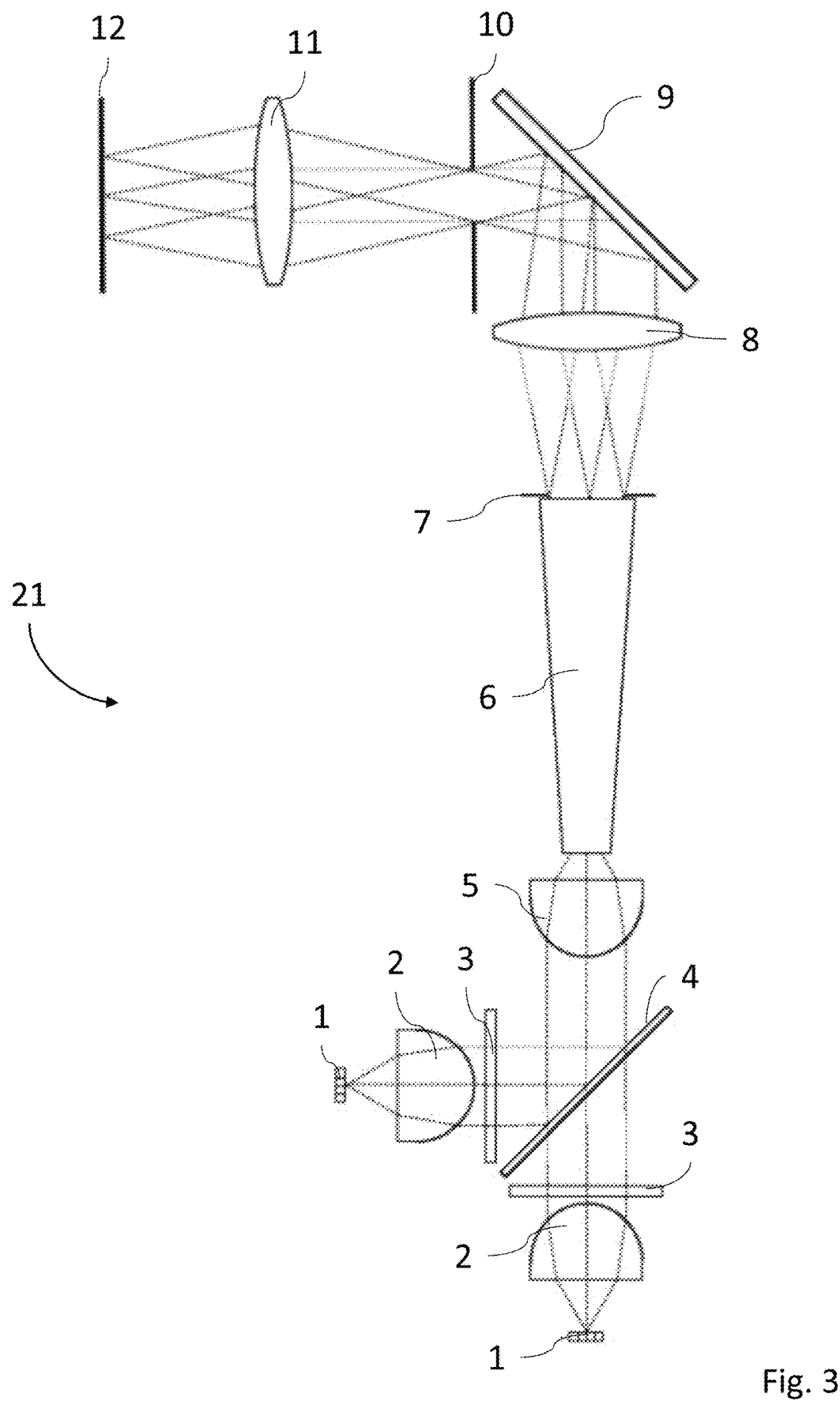
FIG. 3 is a conceptual illustration of an illumination system of the optical measurement unit according to an embodiment of the present disclosure.
Figure 4:
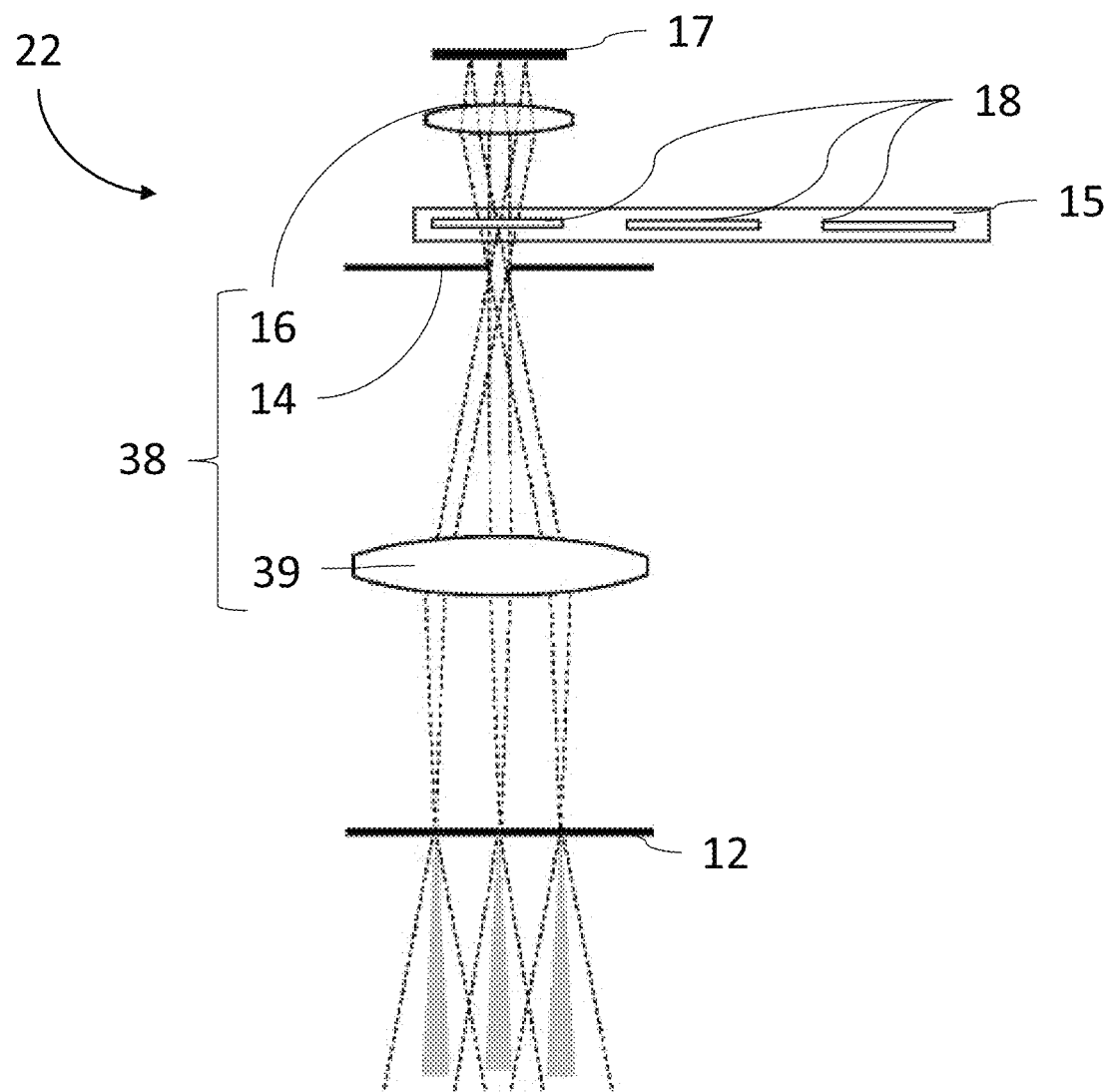
FIG. 4 is a conceptual illustration of an imaging system of the optical measurement unit according to an embodiment of the present disclosure.

FIG. 3 shows the illumination system 21 of the optical measurement unit 20 in a conceptual illustration. The illumination system 21 in FIG. 3 differs from the illumination system 21 shown in FIG. 2 in the circular light stop 13. In FIG. 3, the circular light stop 13 is not arranged in the aperture stop 10. Thus, the circular light stop 13 does not block light within a numerical aperture of 0.1. Hence, in FIG. 3, the illumination system 21 is in the bright-field mode. In particular, the illumination system 21 is adapted for transilluminating the sample plane 12 in the bright-field mode and in the dark-field mode FIG. 4 shows the imaging system 22 of the optical measurement unit 20 in a conceptual illustration. The imaging system 22 comprises a camera sensor 17, which is arranged to detect light of the detection wavelength ranges. Advantageously, the imaging system 22 is highly efficient in collecting fluorescence photons, which enables to detect light of the at least two detection wavelength ranges having a low intensity.

The imaging system 22 additionally comprises optical filters 18. These optical filters 18 may be arranged on a filter switching mechanism 15, which may be a rotatable filter wheel. The filter switching mechanism 15 is adapted to selectively place one of the optical filters 18 in the beam path between the region of interest, here the sample plane 12, and the CMOS camera sensor 17. In particular, the switching mechanism may be motorized, to facilitate a change of filters. The filters 18 may be dielectric band-pass filters having transmission bands. At least 90% of the light having a wavelength range within the transmission band is transmitted through the band-pass filters. Light having a wavelength range outside the transmission band is reduced in its intensity by a factor of six orders of magnitude. For example, the band-pass filters may each have one of the following transmission bands: 481-496 nm, 516-536 nm, 562-579 nm, 602-612 nm, 650-670 nm or 709-745 nm. In particular, the band-pass filters are used for detection of fluorescent light in the dark-field mode. Moreover, the optical filters 18 may comprise a neutral density filter. For example, the neutral density filter reduces the intensity of the light passing through the neutral density filter by a factor of 100. In particular, the neutral density filter is used in the bright-field mode to prevent the camera sensor 17 from saturation.

Furthermore, the imaging system of the presently described embodiment comprises a second optical system 38, which is arranged to create an image of the sample plane 12 on the camera sensor 17. The second optical system 38 comprises a fourth lens group 16, an aperture stop 14 and a third lens group 39 in the beam path in this particular order. The second optical system 38 is well corrected for longitudinal and transversal color aberration. Advantageously, the correction for longitudinal and transversal color aberration makes refocusing for the different detection wavelength ranges superfluous. Thus, all detection wavelength ranges may be detected, without the need of adjusting the focus of the imaging system 22 for each detection wavelength range. The second optical system 38 may be designed such, that the angle of rays transmitting the optical filters 18 of the imaging system 22 is below 6.8°. Advantageously, this minimizes blue shift effects in dielectric band-pass filters.

For example, the imaging system 22 has a second numerical aperture NA2, which corresponds to the numerical aperture of the second optical system 38. The second numerical aperture NA2 of the imaging system 22 may be at most 0.1, preferably at most 0.083.

The second optical system 38 may be a fast telecentric lens. The second optical system 38 may have a nominal numerical aperture value of at most 0.1, in particular at most 0.083. Furthermore, the second optical system 38 may have a magnification of at least 0.4, in particular at least 0.5.

Telecentricity on the object side of the imaging system 22 and telecentricity of the illumination system is critical for dark-field mode generation. Tilting of the chief ray would lead to overlap with the hollow illumination cones generated by the illumination system 21 in the dark-field mode and would degrade the signal to noise ratio in the dark-field mode observation. FIG. 4 depicts the darkfield configuration in which the sample is illuminated only with rays having a ray angle larger than the acceptance angle of the imaging system 22. The second optical system 22 is nearly telecentric on the camera sensors 17 side. In particular, the maximum chief ray angle on the camera sensor 17 is 2°, to avoid efficiency degradation due to the acceptance angle of microoptics in front of the camera sensor 17.

Figure 5:
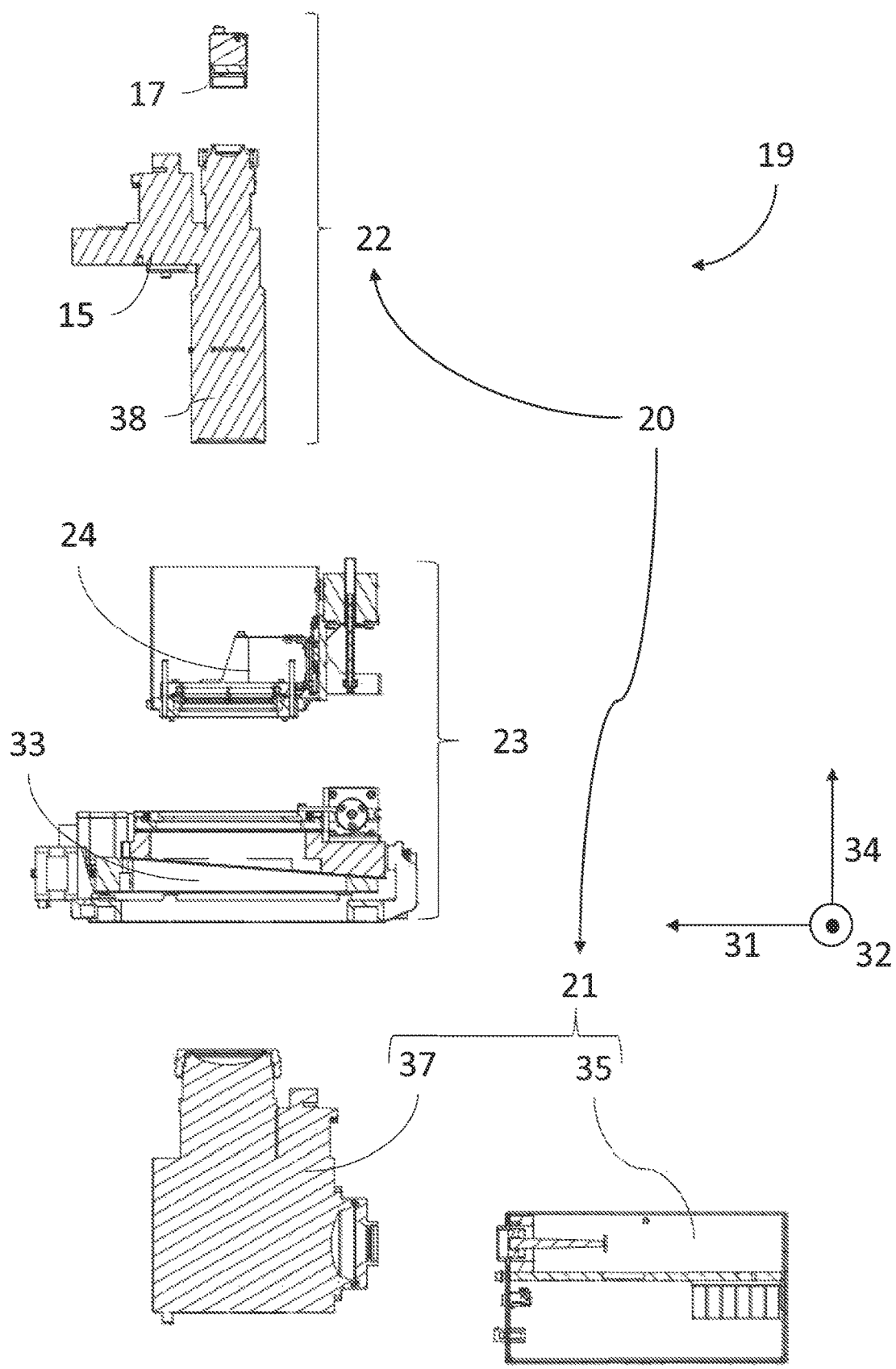
FIG. 5 shows the embodiment of the scanning device of FIG. 1 in a schematic exploded sectional view according to an embodiment of the present disclosure.

In FIG. 5, the scanning device 19 is shown in a schematic exploded sectional view. An object mount 23 is arranged in the beam path, between the illumination system 21 and the imaging system 22. The object mount 23 comprises the xyz-stage 33 and the downholder 24. The illumination system 21 and the imaging system 22 may correspond to the exemplary embodiment shown in FIGS. 2, 3 and 4.

The object mount 23 provides an integrated gripper module for the automated positioning and preparation of consumables for measurements, which is not shown in the figures. The xyz-stage 33 allows the positioning of the consumables (not shown) in x-direction 31, y-direction 32 and z-direction 34 and supports the handover process between a gripper module and the xyz-stage 33. The xyz-stage 33 may be a three-plate wedge system with three-point bearing. The xyz-stage 33 is actuated by a non-captive lead screw stepper motor. Furthermore, the xyz-stage 33 comprises a gear reduction, which enables a high resolution for the precise movement of the sample plane 12 along the z-axis. The gear reduction is defined by of a lead screw pitch, a wedge angle and a motor step angle. The xyz-stage 33 has a three-point bearing, which avoids an overdetermined system structure and results in a high robustness against mechanical tolerances. Different types of rolling bearings, for example guide rails and ball bearings, are used to ensure a low friction relative movement between plates of the three-plate wedge system. Precise positioning of the sample along the z-direction, by means of the xyz-stage 33, enables precise focusing of the imaging system 22 on the sample plane 12. Furthermore, the positioning along the x-, y- and z-axis provides the possibility to compensate tolerances of optics, mechanics and the consumable.

By means of the xyz-stage 33, the consumables are transferred horizontally for scanning of relevant consumable areas. The movement of the xyz-stage along the xy-plane is based on a three-plate technology. The movement along the x-axis and the y-axis is actuated by a stepper motor with lead screw drive. Advantageously, due to this structure the different plates can work independently from each other. The bearing between the plates is made of linear ball cages and rotational encoders on the linear actuators ensure process control regarding positioning along the x- and y-axis.

The xyz-stage 33 can be moved separately or simultaneously along the x-, y- and z-axis. The illumination system and the imaging system provide a free aperture for the implementation close to the illumination objective lens 37, to allow a small illumination working distance in relation to the high numerical aperture. The main functions of the downholder 24 are the positioning of the consumables in x-, y- and z-direction, as well as the compensation of chip unevenness or curvatures. The downholder 24 provides an interface plate with positioning features for passive alignment of the consumables along the x- and y-direction during the insertion of the consumable by means of the gripper module. After the consumable is placed onto the xyz-stage by means of the gripper module, the spring seated plate of the downholder moves downwards along the z-axis and performs thereby the flattening and fixation of the consumables. The spring seated plate contacts the consumables or chips only near their outer edges.

A linear actuator with high helix lead screw drives the downholder 24. For protection against stray light as well as dust and dirt, the complete object mount is covered by sheet metal parts at its circumference.

The downholder 24 may be the only interface between the scanning device 19 and the consumable. Advantageously, small contact interfaces between the scanning device 19 and the consumable reduce the risk of contamination of the scanning device 19. The downholder 24 is mounted on top of the xyz-stage 33. The gripper module may be a multi axis gripper robot which loads and unloads the consumables. For handover purposes, the downholder 24 is in an open position.

Figure 6:
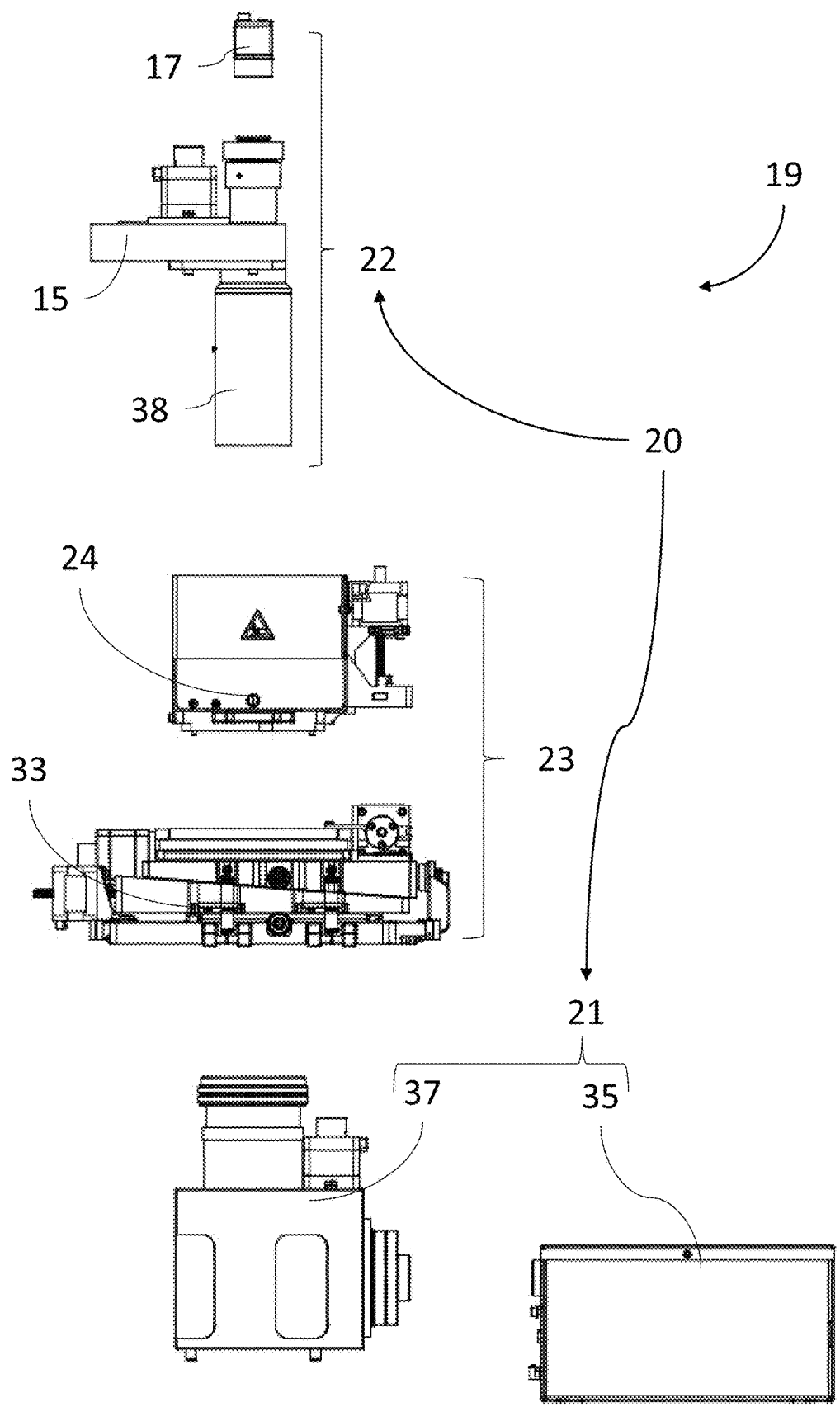
FIG. 6 shows the embodiment of the scanning device of FIG. 1 in a schematic exploded side view according to an embodiment of the present disclosure.

In FIG. 6, the scanning device 19 of FIG. 5 is shown in a schematic exploded side view. In the illumination objective lens 37 and in the imaging system 19, the optical beam path runs in a chassis of the imaging system, the illumination system and the object mount. Advantageously, the chassis is non-transparent, to block stray light from the surrounding.

Figure 7:
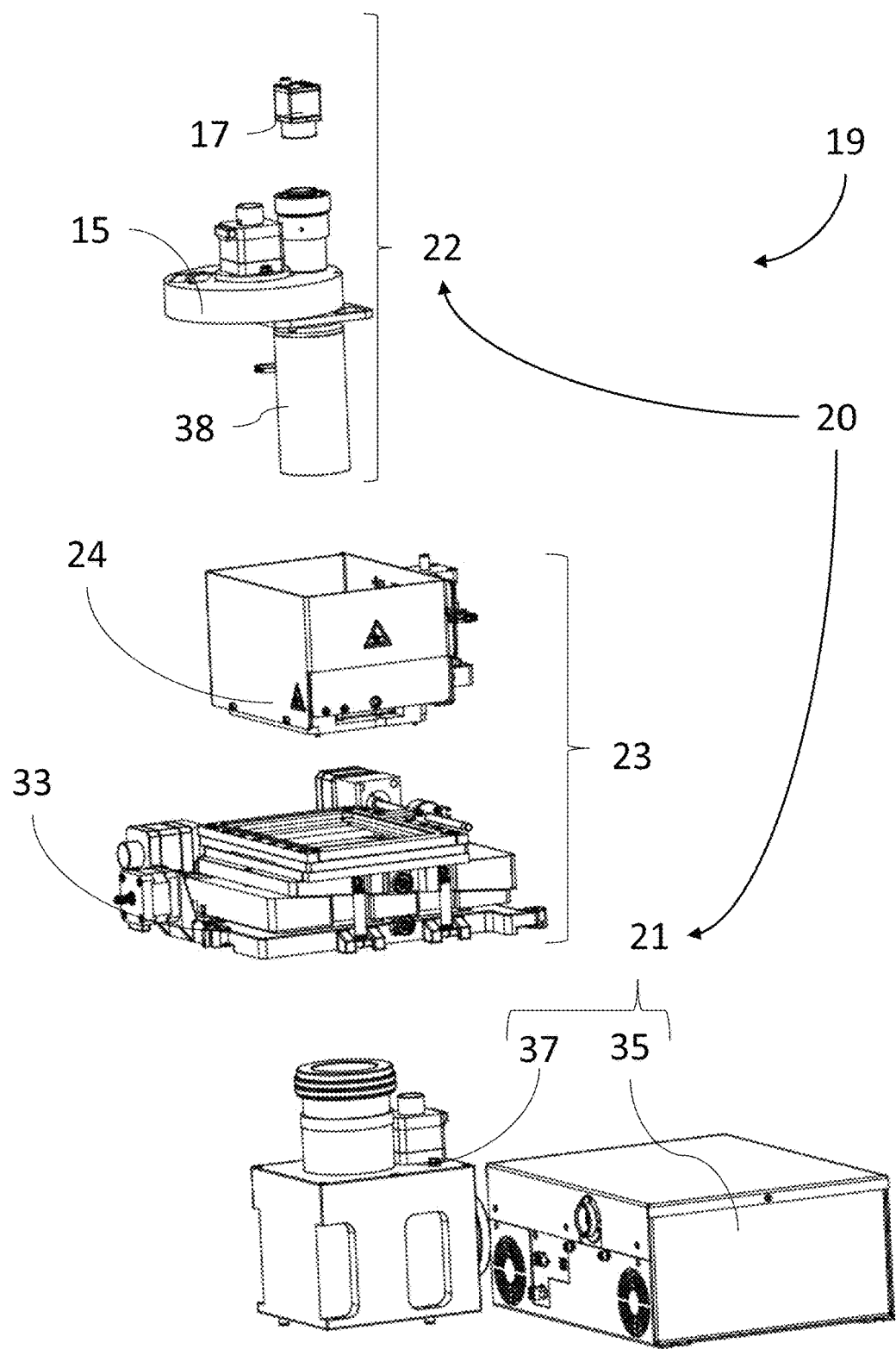
FIG. 7 shows the embodiment of the scanning device of FIG. 1 in a schematic exploded perspective view according to an embodiment of the present disclosure.

In FIG. 7, the scanning device 19 of FIG. 5 is shown in a schematic exploded perspective view. The xyz-stage comprises multiple wedges, which allow adjusting the position of the sample on top of the xyz-stage. Advantageously, the positioning of the sample by means of the xyz-stage has high precision.

Figure 8:
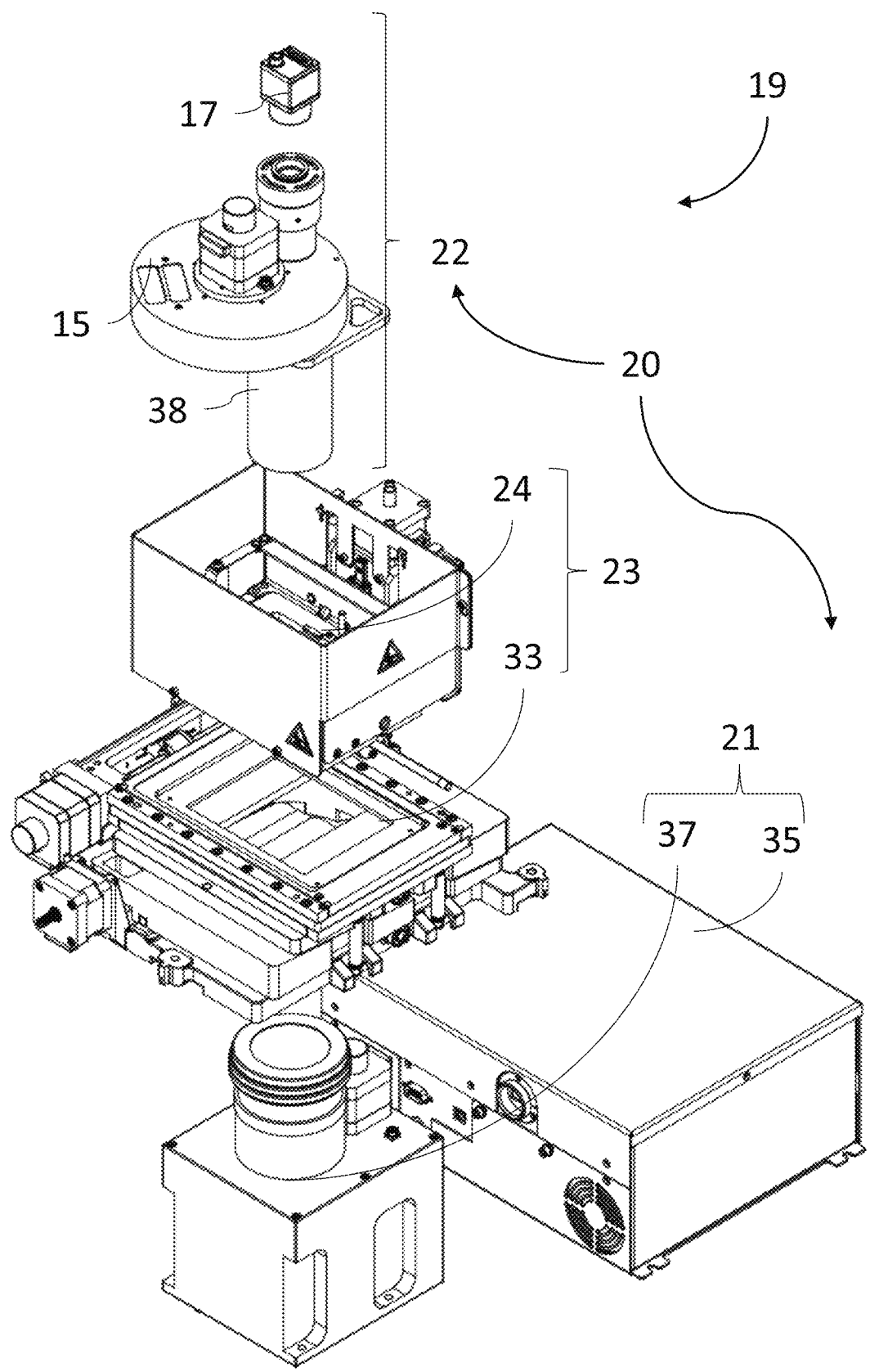
FIG. 8 shows the embodiment of the scanning device of FIG. 1 in a schematic exploded perspective view according to an embodiment of the present disclosure.

In FIG. 8, the scanning device 19 of FIG. 5 is shown in schematic exploded perspective view. The xyz-stage 33 comprises a frame-like structure, which advantageously allows transillumination of the samples.

Figure 9:
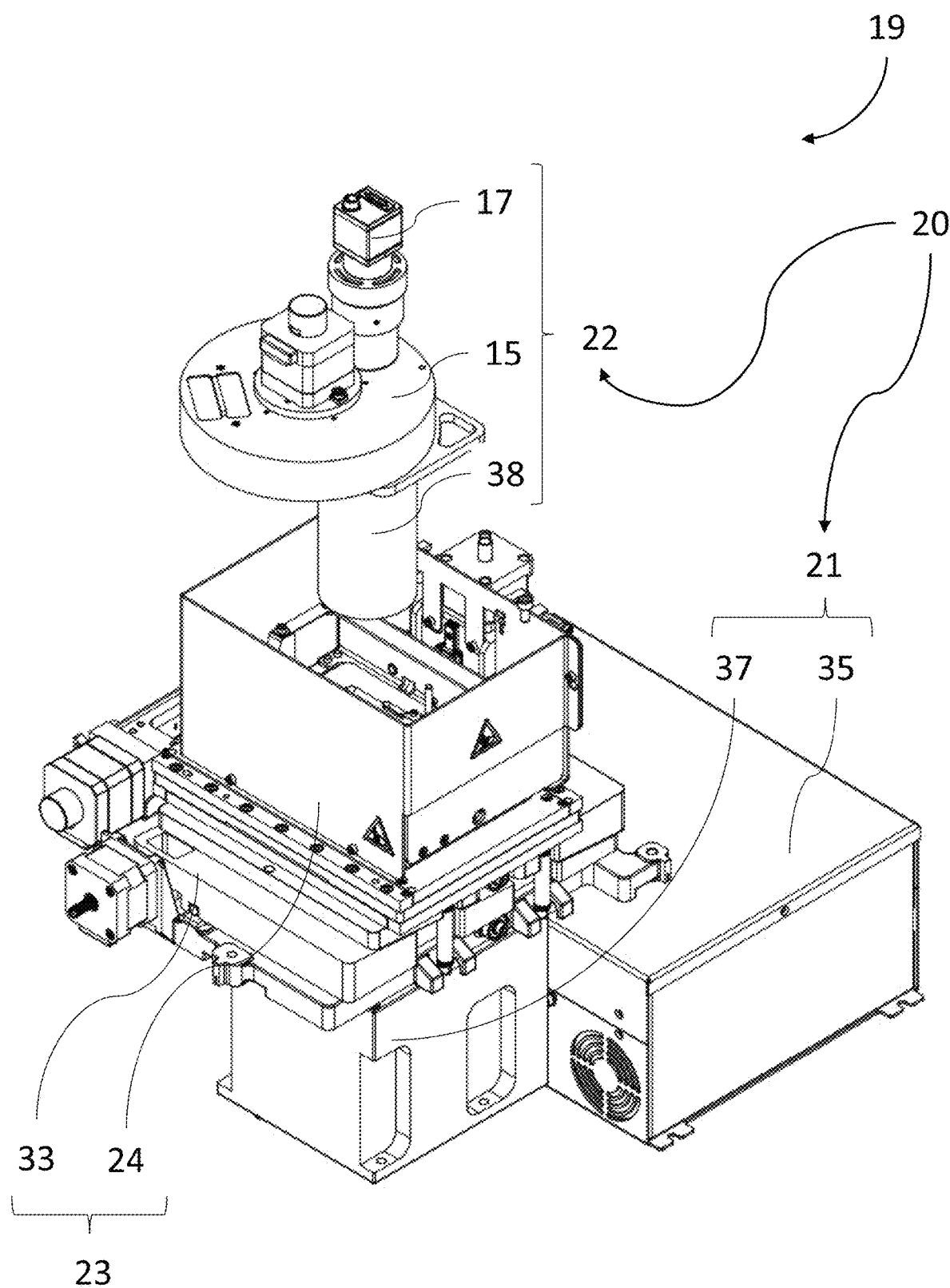
FIG. 9 shows the embodiment of the scanning device of FIG. 1 in a schematic perspective view according to an embodiment of the present disclosure.

In FIG. 9, the scanning device 19 of FIG. 5 is shown in a schematic perspective view. The graphical representation in FIG. 9 differs from the graphical representation of the FIGS. 6, 7 and 8 in the distances between the illumination system 21, the imaging system 22 and the object mount 23. For better understanding and visibility, the scanning device 19 is shown without its chassis, the gripper module and the storage. The chassis may surround the illumination 21 system, the imaging system 22 and the object mount 23. In particular, the chassis may protect the samples during the measurement from environmental light. Furthermore, the chassis may provide mechanical stability to the scanning device 19.

The scanning device 19 includes gripper module (not shown), to load and unload consumables (not shown) from the xyz-stage 33. The gripper module comprises storage, which may carry multiple samples, in particular multiple chips or consumables. For example, each consumable consists of a frame and two microfluidic chips with eight channels and integrated microstructures. In the channels of the chips, the samples 30 may be arranged.

Figure 10:
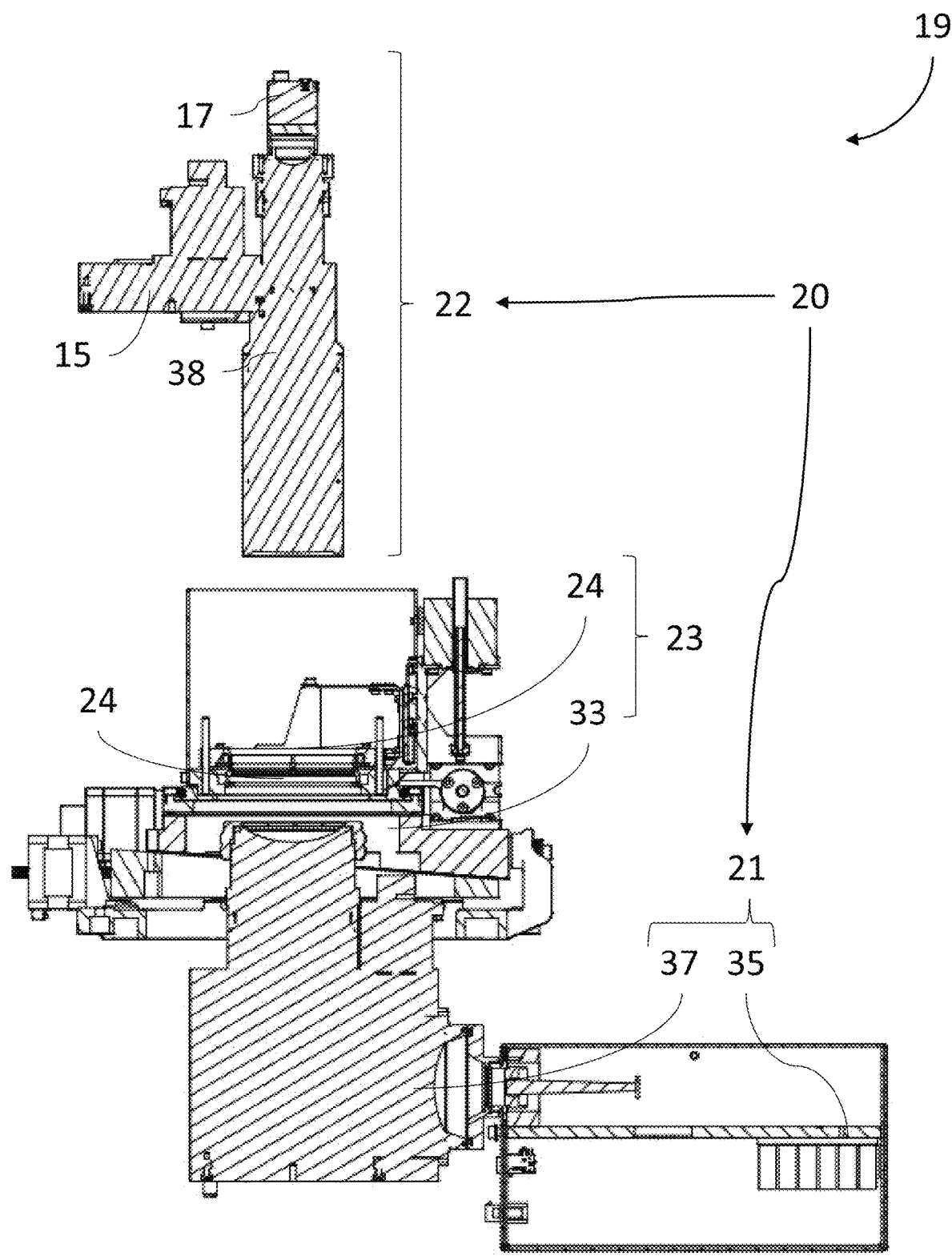
FIG. 10 shows the embodiment of the scanning device of FIG. 1 in a schematic sectional view according to an embodiment of the present disclosure.

FIG. 10 shows the embodiment of the scanning device of FIG. 1 in a schematic sectional view. The downholder 24 pushes the consumable against the xyz-stage 33, for a flattening fixation of the consumable. The illumination objective lens 37 partially projects into a recess within the xyz-stage 33. Advantageously, no stray light may enter the beam path at the transition between the xyz-stage 33 and the illumination objective lens 37.

Figure 11:
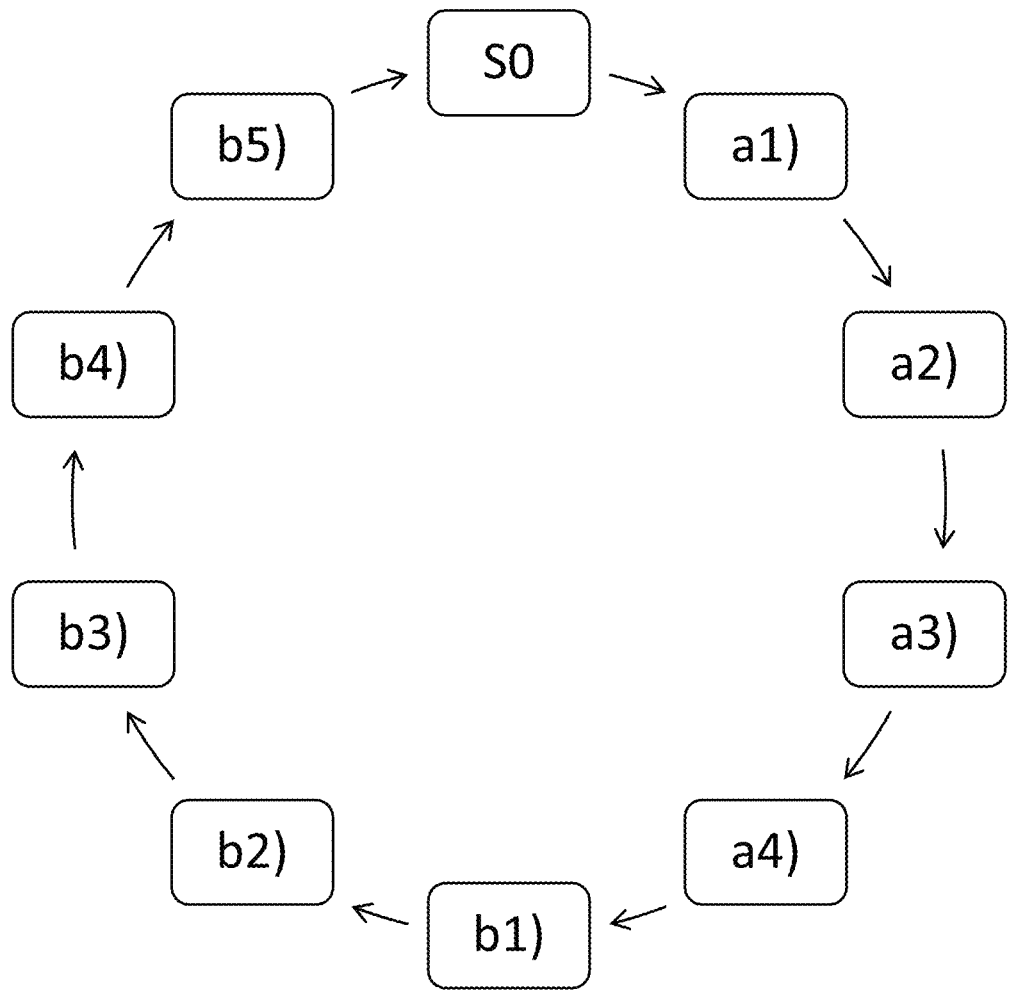
FIG. 11 shows the method for operating the scanning device in a schematic flow chart according to an embodiment of the present disclosure.

FIG. 11 shows the method for operating the scanning device in a schematic flow chart. In particular, the scanning device 19 comprises control electronics 29, which may be arranged to perform the following method steps S0, a1), a2), a3), a4), b1), b2), b3), b4) by means of the scanning device 19:

In the method step S0, the sample to be measured, in particular the consumable or the chip, is loaded onto the xyz-stage 33. If a sample was arranged on the xyz-stage 33 from a previous measurement, the gripper module 27 unloads that sample from the xyz-stage 33.

In the method steps a1), a2), a3) and a4), a sample specific focus map is generated. In method step a1), the sample is moved to a multiplicity of focus map positions along the x- and y-axis. In particular, the focus map positions are predefined, in order to capture the entirety of all samples by means of the imaging system. In method step a2) an image set is generated by focus stacking along the z-axis at each focus map position. In particular, the imaging system captures multiple frames, wherein at each frame, the sample is in a different position along the z-axis. Thus, in method step a3), an optimum z-axis position is determined at each focus map position. Thereby, one of the frames captured in method step a2) is selected according to a predefined criterion. The criterion may be the highest sharpness of sample. The optimum z-axis positions are assigned to the focus map positions respectively in method step a4).

In the method steps b1), b2), b3), b4) and b5), the sample is scanned by means of the scanning device 19. In method step b1), the sample is moved to a scan position along the x- and y-axis. In particular, the sample is moved to one of the focus map positions. In method step b2), the sample is moved to a focus position along the z-axis. In particular, the focus position is the optimum z-axis position, which is determined by means of the object-specific focus map in method-step a3). In method step b3), the illumination system is set into dark-field mode, by arranging the circular aperture stop 13 within the beam path. In method step b4), the dark-field mode, the illumination system illuminates the object within the field of view with the different illumination wavelength ranges consecutively. The imaging system captures an image of the sample within the field of view for each assigned detection wavelength range. In method step b5), the method steps b1) to b4) are repeated at different scan positions, until the imaging system has captured the entire sample or the entirety of all samples. In particular, the illumination system may be maintained in dark-field mode, until method step b5) is completed.

After method step b5) is completed, the method step S0 is performed, by moving the xyz-stage 33 to the handover position, in which the gripper module 27 unloads the sample. In particular, the method steps S0, a1), a2), a3), a4), b1), b2), b3), b4) and b5) may be repeated multiple times, to measure multiple samples, chips or consumables.

Figure 12:
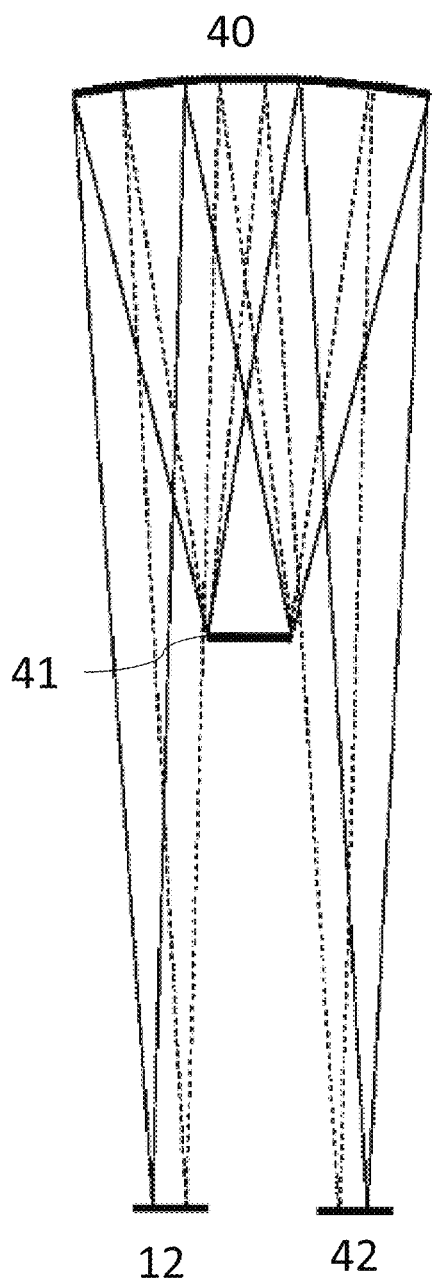
FIG. 12 shows an alternative embodiment of an illumination objective lens of the illumination system in a schematic side view.

In FIG. 12, an alternative embodiment of the second optical system 38 in the form of an imaging objective lens is depicted schematically. According to this alternative, the same is implemented as a mirror system like the Offner relay system. Here, the Offner relay system consists of two concentric mirrors, namely a concave mirror 40 and a convex mirror 41. Through the two mirrors, the sample plane 12 is imaged with unit magnification to an image plane 42. The Offner relay has nearly diffraction limited imaging performance, is bi-telecentric and is free of distortion due to its symmetric setup. As imaging is accomplished only by reflection, there is zero chromatic aberrations by design.

Figure 13:
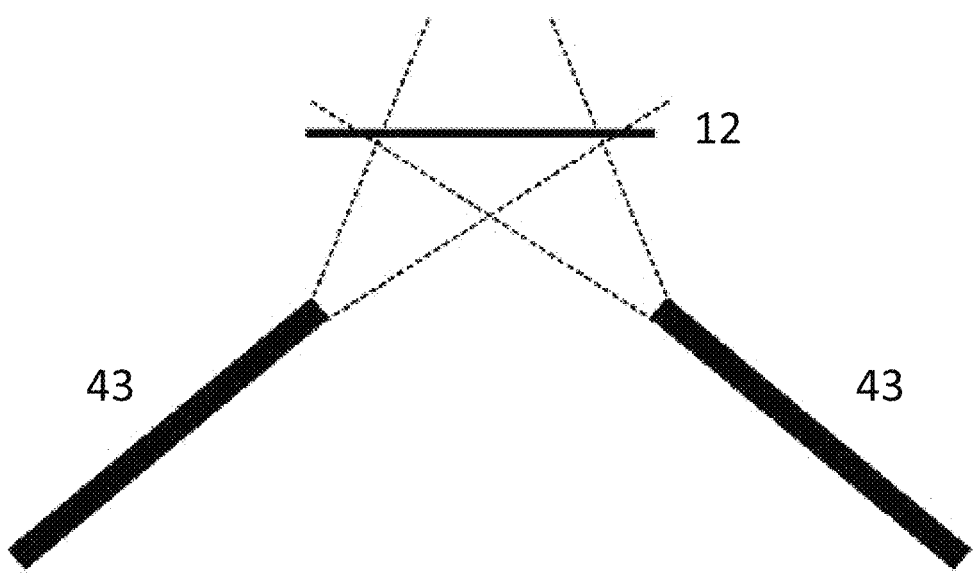
FIG. 13 shows a further alternative embodiment of an illumination objective lens of the illumination system in a schematic side view.

In FIG. 13, a further alternative embodiment of the illumination objective lens 37 is depicted schematically. According to this alternative, the illumination system comprises optical fibers 43, which are arranged to illuminate the sample plane 12 under an angle. The optical fibers 43 generate illumination spots, which overlap in the sample plane 12, to generate a homogeneous illumination of the sample plane. The FIG. 13 shows only two fibers 43, but more fibers may improve the homogeneity of the illumination. Those who are familiar with the art will appreciate that fiber illumination can be accomplished from above or below the sample plane, in order to generate either trans-illumination or reflective illumination.

While the current disclosure has been described in relation to its specific embodiments, it is to be understood that this description is for illustrative purposes only. Accordingly, it is intended that the disclosure be limited only by the scope of the claims appended hereto. In addition, various publications are cited herein, the disclosures of which are incorporated by reference in their entireties.

LIST OF REFERENCE NUMERALS

1 LED array
2 collimation optic
3 dielectric filter
4 dichroic mirror
5 coupling lens
6 homogenizing rod
7 field aperture
8 first lens group
9 folding mirror
10 aperture stop of illumination system
11 second lens group
12 sample plane
13 circular light stop
14 adjustable aperture stop
15 switching mechanism
16 fourth lens group
17 camera sensor
18 band-pass filter/neutral density filter
19 scanning device
20 optical measurement unit
21 illumination system
22 imaging system
23 object mount
24 downholder
25 chip
26 consumable
27 gripper module
28 storage
29 control electronics
30 sample
31 x-axis
32 y-axis
33 xyz-stage
34 z-axis
35 light source
37 illumination objective lens
38 second optical system
39 third lens group
40 concave mirror
41 convex mirror
42 image plane
43 optical fiber
NA1 first numerical aperture
NA2 second numerical aperture
S0 method starting step/loading step
a1-a4 method steps/sample specific focus map generation steps
b1-b5 method steps/sample scanning steps

The invention claimed is:

1. An optical measurement unit for a scanning device comprising an illumination system arranged to emit light of at least two different illumination wavelength ranges, and an imaging system arranged to detect light of at least two different detection wavelength ranges, wherein
   each detection wavelength range is assigned to one of the at least two different illumination wavelength ranges;
   the illumination system is adapted for transillumination in a bright-field mode and in a dark-field mode;
   the illumination system has a first numerical aperture;
   the imaging system has a second numerical aperture, and the first numerical aperture is larger than the second numerical aperture.

2. The optical measurement unit according to claim 1, wherein the imaging system is bi-telecentric and the illumination system is bitelecentric.

3. The optical measurement unit according to claim 1, wherein in the dark field mode, the illumination system is arranged to emit light in a first angle range relative to an entrance pupil of the imaging system, and in the bright field mode, the illumination system is arranged to emit light in a second angle range relative to the entrance pupil of the imaging system, wherein the first angle range comprises angles larger than a maximum angle of acceptance of the imaging system, and the second angle range comprises angles smaller than the maximum angle of acceptance of the imaging system.

4. The optical measurement unit according to claim 1, wherein each illumination wavelength range is designed to excite a predefined fluorescent material to generate a fluorescent radiation, and wherein the fluorescent radiation is within the detection wavelength range assigned to the respective illumination wavelength range.

5. The optical measurement unit according to claim 1, wherein the imaging system comprises a band pass filter for each detection wavelength range, and wherein the imaging system comprises a neutral density filter.

6. A scanning device comprising the optical measurement unit according to claim 1 and an object mount, wherein the imaging system is adapted to detect electromagnetic radiation within a field of view, and the object mount is adapted to determine the positioning of a sample along an x axis, a y-axis and a z-axis within the field of view.

7. The scanning device according to claim 6, wherein the illumination system is arranged to illuminate the sample along the z-axis from a first side of the object mount, and the imaging system is arranged to detect fluorescent radiation which is emitted away from a second side of the object mount, wherein the first and the second side of the object mount are opposed to each other.

8. The scanning device according to claim 6, wherein the sample is contained in a consumable, and the object mount comprises a downholder arranged to push a main surface of the consumable against a planar surface of the object mount to achieve a flattening fixation of the consumable.

9. The scanning device according to claim 6, wherein the imaging system and the illumination system are well corrected for chromatic aberration, such that a focus for all detection wavelength ranges is substantially the same and a focus for all illumination wavelength ranges is substantially the same.

10. The scanning device according to claim 6, wherein the sample is a digital Polymerase Chain Reaction (PCR) Chip.

11. A method for operating a scanning device according to claim 5, the method comprising the steps of a) generating a consumable-specific focus map, wherein
 a1) a consumable is moved to a multiplicity of focus map positions along an x- and a y-axis,
 a2) at each focus map position an image set is generated by focus stacking along a z-axis,
 a3) an optimum z-axis position is determined at each focus map position, and
 a4) the optimum z-axis position are assigned to the focus map positions respectively, b) scanning a sample, wherein
 b1) the consumable is moved to a scan position along the x- and the y-axis,
 b2) the consumable is moved to a focus position along the z-axis, wherein the focus position is determined by means of the consumable-specific focus map,
 b3) the illumination system is set into dark field mode,
 b4) the illumination system illuminates the sample within a field of view with different illumination wavelength ranges consecutively and the imaging system captures an image of the sample within the field of view for each assigned detection wavelength range, and
 b5) the method steps b1) to b4) are repeated at different scan positions, until the imaging system has captured the entire sample.

12. The method according to claim 11, further comprising the steps of arranging the consumable on an xyz-stage, and performing a flattening fixation of the consumable, wherein the consumable is pushed against a planar surface of the xyz-stage by means of a downholder.

13. The method according to claim 11, wherein during method step b4) the focus position along the z-axis of the illumination system is basically the same for all illumination wavelength ranges, and the focus position along the z-axes of the imaging system is basically the same for all detection wavelength ranges.

14. The method according to claim 11, wherein the consumable-specific focus map comprises optimum focus positions along the z-axis for the imaging system and for the illumination system.

15. The method according to claim 11, wherein during method step a) the neutral density filter of the imaging system is interposed.

\* \* \* \* \*